(12) United States Patent
Bourdoux et al.

(10) Patent No.: US 8,219,078 B2
(45) Date of Patent: Jul. 10, 2012

(54) METHOD AND APPARATUS FOR MULTI-USER MULTI-INPUT MULTI-OUTPUT TRANSMISSION

(75) Inventors: Andre Bourdoux, Esneux (BE); Nadia Khaled, Leuven (BE)

(73) Assignee: IMEC, Leuven (BE)

( * ) Notice: Subject to any disclaimer, the term of this patent is extended or adjusted under 35 U.S.C. 154(b) by 0 days.

(21) Appl. No.: 13/115,486

(22) Filed: May 25, 2011

(65) Prior Publication Data

US 2011/0317575 A1 Dec. 29, 2011

Related U.S. Application Data

(62) Division of application No. 10/645,858, filed on Aug. 20, 2003, now Pat. No. 7,961,809.

(60) Provisional application No. 60/405,759, filed on Aug. 22, 2002.

(51) Int. Cl.
*H04W 24/00* (2009.01)

(52) U.S. Cl. ..... 455/424; 455/423; 455/425; 455/67.11; 455/67.13; 455/67.14; 455/115.1; 455/115.2; 455/115.3; 455/226.1; 455/226.2; 455/561; 324/520; 324/521; 324/522; 324/523; 324/750.01; 324/750.02; 375/224

(58) Field of Classification Search .......... 455/423–425, 455/67.11–67.16, 115.1–115.3, 226.1–226.3, 455/561; 324/520–523, 527, 528, 763, 763.01, 324/750.01, 750.02; 375/224–228, 375
See application file for complete search history.

(56) References Cited

U.S. PATENT DOCUMENTS

| | | | | |
|---|---|---|---|---|
| 5,835,850 A * | 11/1998 | Kumar | ...... | 455/67.14 |
| 6,009,317 A * | 12/1999 | Wynn | ...... | 455/296 |
| 6,118,811 A * | 9/2000 | Narumi et al. | ...... | 375/219 |
| 6,397,042 B1 * | 5/2002 | Prentice et al. | ...... | 455/67.14 |
| 6,535,731 B1 * | 3/2003 | Pillekamp et al. | ...... | 455/444 |
| 6,832,075 B1 * | 12/2004 | Henry, Jr. | ...... | 455/67.14 |
| 6,987,951 B2 * | 1/2006 | Boos | ...... | 455/85 |
| 7,020,220 B2 * | 3/2006 | Hansen | ...... | 375/324 |
| 7,139,540 B2 * | 11/2006 | Wu et al. | ...... | 455/251.1 |
| 7,233,629 B2 * | 6/2007 | Auranen | ...... | 375/316 |
| 7,313,198 B2 * | 12/2007 | Rahman et al. | ...... | 375/297 |
| 2003/0095607 A1 * | 5/2003 | Huang et al. | ...... | 375/296 |

* cited by examiner

*Primary Examiner* — Tuan A Tran

(74) *Attorney, Agent, or Firm* — Knobbe Martens Olson & Bear LLP

(57) ABSTRACT

Embodiments of the present invention relate to methods and systems of transmitting data signals from at least one transmitting terminal with a spatial diversity capability to at least two receiving user terminals, each provided with spatial diversity receiving device. The methods and systems are useful, for example, in communication between terminals, e.g., wireless communication. In certain embodiments, transmission can be between a base station and two or more user terminals, wherein the base station and user terminals are each equipped with more than one antenna.

20 Claims, 17 Drawing Sheets

| # of UT antenna | $G^u$ | $H^u$ | $N^u$ | $E^u$ | $H^u \cdot N_u$ |
|---|---|---|---|---|---|
| 2 | 2x2 | 2x8 | 8x4 | 4x2 | 2x4 |
| 3 | 2x3 | 3x8 | 8x2 | 2x2 | 3x2 |

Fig. 7

| BER | # users | 5 degr. & 0.7 dB reciprocity mismatch | With calibration |
|---|---|---|---|
| $10^{-2}$ | 2 | 0.44 dB | 0.04 dB |
| | 3 | 1.48 dB | 0.11 dB |
| | 4 | ∞ | 1.30 dB |
| $10^{-3}$ | 2 | 1.02 dB | 0.11 dB |
| | 3 | ∞ | 0.49 dB |
| | 4 | ∞ | ∞ (not targeted) |

Fig. 16

METHOD AND APPARATUS FOR MULTI-USER MULTI-INPUT MULTI-OUTPUT TRANSMISSION

CROSS REFERENCE TO RELATED APPLICATIONS

The present application is a divisional of U.S. application Ser. No. 10/645,858, filed Aug. 20, 2003, entitled "METHOD AND APPARATUS FOR MULTI-USER MULTI-INPUT MULTI-OUTPUT TRANSMISSION," which claims priority under 35 U.S.C. §119(e) to U.S. Provisional Application No. 60/405,759, filed on Aug. 22, 2002. Each of the above applications is hereby incorporated by reference in its entirety.

BACKGROUND OF THE INVENTION

1. Field of the Invention

The present invention relates to a method for multi-user MIMO transmission, more in particular, a method for transmission between a base station and U (>1) user terminals, said base station and user terminals each equipped with more than one antenna, preferably in conjunction with considering the optimizing of joint transmit and receive filters, for instance in a MMSE context. Further disclosed are base station and user terminal devices suited for execution of said method.

2. Description of the Related Technology

Multi-input multi-output (MIMO) wireless communications have attracted a lot of interest in the recent years as they offer a multiplicity of spatial channels for the radio links, hence provide a significant capacity or diversity increase compared to conventional single antenna communications.

Multi-Input Multi-Output (MIMO) wireless channels have significantly higher capacities than conventional Single-Input Single-Output (SISO) channels. These capacities are related to the multiple parallel spatial subchannels that are opened through the use of multiple antennas at both the transmitter and the receiver. Spatial Multiplexing (SM) is a technique that transmits parallel independent data-streams on these available spatial subchannels in an attempt to approach the MIMO capacities.

In addition, Spatial-Division Multiple Access (SDMA) is very appealing due to its inherent reuse (simultaneously for various users due to the exploitation of the distinct spatial signatures of the users) of the precious frequency bandwidth.

Several MIMO approaches can be followed which can be classified according to whether or not they require channel knowledge at either the transmitter or the receiver. Typically, the best performance can be obtained when the channel is known at both sides.

The optimal solution is provided by SVD weights combined with a water-pouring strategy. However, this strategy must adaptively control the number of streams and also the modulation and coding in each stream, which makes it inconvenient for wireless channels.

A sub-optimal approach consists of using a fixed number of data streams and identical modulation and coding as in a single-user joint transmit-receive (TX-RX) MMSE optimization [H. Sampath and A. Paulraj, "Joint TX & RX Optimization for High Data Rate Wireless Communication Using Multiple Antennas", *Asilomar conf. On signals, systems and computers*, pp. 215-219, Asilomar, Calif., November 1999]. This latter solution is more convenient but is not directly applicable to SDMA MIMO communications where a multi-antenna base station communicates at the same time with several multi-antenna terminals. Indeed, the joint TX-RX optimization requires channel knowledge at both sides, which is rather unfeasible at the terminal side (the terminal only knows its part of the multi-user wireless channel).

To approach the potential MIMO capacity while optimizing the system performance, several joint TX/RX MMSE designs have been proposed.

Two main design trends have emerged that enable Spatial Multiplexing corresponding to whether Channel State Information (CSI) is available at the transmitter. On the one hand, BLAST-like space-time techniques make use of the available transmit antennas to transmit as many independent streams and do not require CSI at the transmitter. On the other hand, the joint transmit and receive space-time processing takes advantage of the potentially available CSI at both sides of the link to maximize the system's information rate or alternatively optimize the system performance, under a fixed rate constraint.

Within multi-user MIMO transmission schemes multi-user interference results in a performance limitation. Further, the joint determination of optimal filters for both the base station and the user terminals in the case of a multi-user context is very complex.

SUMMARY OF CERTAIN INVENTIVE ASPECTS

Embodiments of the present invention provide a solution for the problem of multi-user interference in a multi-user MIMO transmission scheme, which results in a reasonably complex filter determination in the case of joint optimal filter determination, although the invention is not limited thereto.

The invention includes a method of multi-user MIMO transmission of data signals from at least one transmitting terminal with a spatial diversity capability to at least two receiving user terminals, each provided with spatial diversity receiving capability, comprising: dividing said data signals into a plurality of streams of (sub-user) data sub-signals; determining combined data signals in said transmitting terminal, said combined data signals being transformed versions of said streams of data sub-signals, such that at least one of said spatial diversity devices of said receiving user terminals only receives data sub-signals being specific for the corresponding receiving user terminal; inverse subband processing said combined data signals; transmitting with said spatial diversity device said inverse subband processed combined data signals; receiving on at least one of said spatial diversity receiving device of at least one of said receiving terminals received data signals, being at least a function of said inverse subband processed combined data signals; determining on at least one of said receiving terminals estimates of said data sub-signals from said received data signals; and collecting said estimates of said data sub-signals into estimates of said data signals.

In certain embodiments, the transmission of the inverse subband processed combined data signals is performed in a substantially simultaneous way. Typically, the spectra of the inverse subband processed combined data signals are at least partly overlapping.

In some embodiments, the step of determining combined data signals in the transmitting terminal is carried out on a subband by subband basis. In other embodiments, the step of determining the estimates of said data sub-signals in the receiving terminals comprises subband processing.

The determining combined data signals in the transmitting terminal may additionally comprise: determining intermediate combined data signals by subband processing of the data signals; and determining the combined data signals from the intermediate combined data signals.

In other embodiments, the subband processing includes orthogonal frequency division demultiplexing and the inverse subband processing includes orthogonal frequency division multiplexing.

In certain embodiments, the method includes subbands that are involved in inverse subband processing being grouped into sets, whereby at least one set includes at least two subbands and the step of determining combined data signals in the transmitting terminal comprises: determining relations between the data signals and the combined data signals on a set-by-set basis; and exploiting the relations between the data signals and the combined data signals for determining the data signals.

A guard interval may be introduced in the inverse subband processed combined data signals.

The determining combined data signals may further comprise transmitter filtering. Wherein the determining estimates of the sub-signals comprises receiver filtering, said transmitter filtering and said receiver filtering being determined on a user-by-user basis.

In certain embodiments, the number of streams of data sub-signals is variable. In other embodiments, the number of streams is selected in order to minimize the error between the estimates of the data sub-signals and the data sub-signals themselves. Alternatively, the number of streams may be selected in order to minimize the system bit error rate.

Another aspect includes a method of transmitting data signals from at least two transmitting terminals each provided with spatial diversity transmitting device to at least one receiving terminal with a spatial diversity receiving device comprising: dividing said data signals into a plurality of streams of (sub-user) data sub-signals; transforming versions of said streams of said data sub-signals into transformed data signals; transmitting from said transmitting terminals said transformed data signals; receiving on said spatial diversity receiving device received data signals being at least function of at least two of said transformed data signals; subband processing of at least two of said received data signals in said receiving terminal; applying a linear filtering on said subband processed received data signals, said linear filtering and said transforming being selected such that the filtered subband processed received data signals are specific for one of said transmitting terminals; determining estimates of said data sub-signals from said filtered subband processed received data signals in said receiving terminal; and collecting said estimates of said data sub-signals into estimates of said data signals.

In certain embodiments, the transmission is substantially simultaneous and the spectra of the transformed data signals are at least partly overlapping. Additionally, the transformation of the data sub-signals to transformed data sub-signals may comprise inverse subband processing.

In an alternative embodiment, the determining estimates of the data sub-signals from subband processed received data signals in the receiving terminal comprises: determining intermediate estimates of the data sub-signals from the subband processed received data signals in the receiving terminal; and obtaining the estimates of the data sub-signals by inverse subband processing the intermediate estimates.

Another aspect includes an apparatus for transmitting inverse subband processed combined data signals to at least one receiving user terminal with spatial diversity device comprising at least: at least one spatial diversity transmitter; circuitry configured to divide data signals into streams of data sub-signals; circuitry configured to combine data signals, such that at least one of said spatial diversity device of said receiving user terminals only receives data sub-signals being specific for the corresponding receiving user terminal; circuitry being adapted for inverse subband processing combined data signals; and circuitry being adapted for transmitting inverse subband processed combined data signals with said spatial diversity device.

Additionally, the circuitry is configured to combine data signals and may comprise a plurality of circuits, each configured to combine data signals based at least on part of the subbands of the data sub-signals.

In other embodiments, the spatial diversity transmitter comprises at least two transmitters and the circuitry configured to transmit inverse subband processed combined data signals comprises a plurality of circuits configured to transmit the inverse subband processed combined data signals with one of the transmitters of the spatial diversity device.

Yet another aspect includes an apparatus for transmitting data signals to at least one receiving terminal with the spatial diversity device, comprising at least: at least one spatial diversity transmitter; circuitry configured to divide data signals into streams of data sub-signals; circuitry configured to transform versions of the data sub-signals; and circuitry configured to transmit with the spatial diversity device the transformed versions of the data sub-signals, such that at least one of the spatial diversity devices of the receiving terminal only receives specific received data sub-signals.

A further aspect includes a method to calibrate a transceiver for wireless communication comprising at least one transmitter/receiver pair connected to an antenna branch, such that front-end mismatches in the transmitter/receiver pair can be compensated, comprising: providing a splitter, a directional coupler, a transmit/receive/calibration switch, a calibration noise source and a power splitter; matching the power splitter outputs between all branches of the transceiver, matching the directional couplers and matching the transmit/receive/calibration switches between all antenna branches of the transceiver; switching on the calibration connection of the transmit/receive/calibration switch; in each of the antenna branches, generating a known signal and calculating an averaged frequency response of the cascade of the transmitter and the receiver of the transmitter/receiver pair; connecting the transmit/receive/calibration switch so as to isolate the receiver from both the transmitter and the antenna; switching on the calibration noise source; calculating an averaged frequency response of all receiver branches of the transceiver; determining the values to be pre-compensated from the calculated averaged frequency responses of the cascade of the transmitter and the receiver of the transmitter/receiver pair and of all receiver branches of said transceiver; and pre-compensating the transmitter/receiver pair using the inverse of the values.

In certain embodiments, the transceiver is a base station transceiver. In addition, the pre-compensating may be performed digitally.

BRIEF DESCRIPTION OF THE DRAWINGS

FIG. 7 illustrates the matrix dimension for 8 antennas at the base station.

FIG. 16 illustrates the BER degradation with and without calibration.

DETAILED DESCRIPTION OF CERTAIN EMBODIMENTS

The following detailed description of certain embodiments presents various descriptions of specific embodiments of the present invention. However, the present invention can be embodied in a multitude of different ways. In this description, reference is made to the drawings wherein like parts are designated with like numerals throughout.

Embodiments of the systems and methods involve (wireless) communication between terminals. One can logically group the terminals on each side of the communication and refer to them as peers. The peer(s) on one side of the communication can embody at least two user terminals, whereas on the other side the peer(s) can embody at least one base station. Thus, the systems and methods can involve multi-user communications. The peers can transmit and/or receive information. For example, the peers can communicate in a half-duplex fashion, which refers to either transmitting or receiving at one instance of time, or in a full duplex fashion, which refers to substantially simultaneously transmitting and receiving.

Certain embodiments include MIMO wireless communication channels, as they have significantly higher capacities than conventional SISO channels. Several MIMO approaches may be used, depending on whether channel knowledge is available at either the transmit or receive side, as discussed below.

Figure 1:
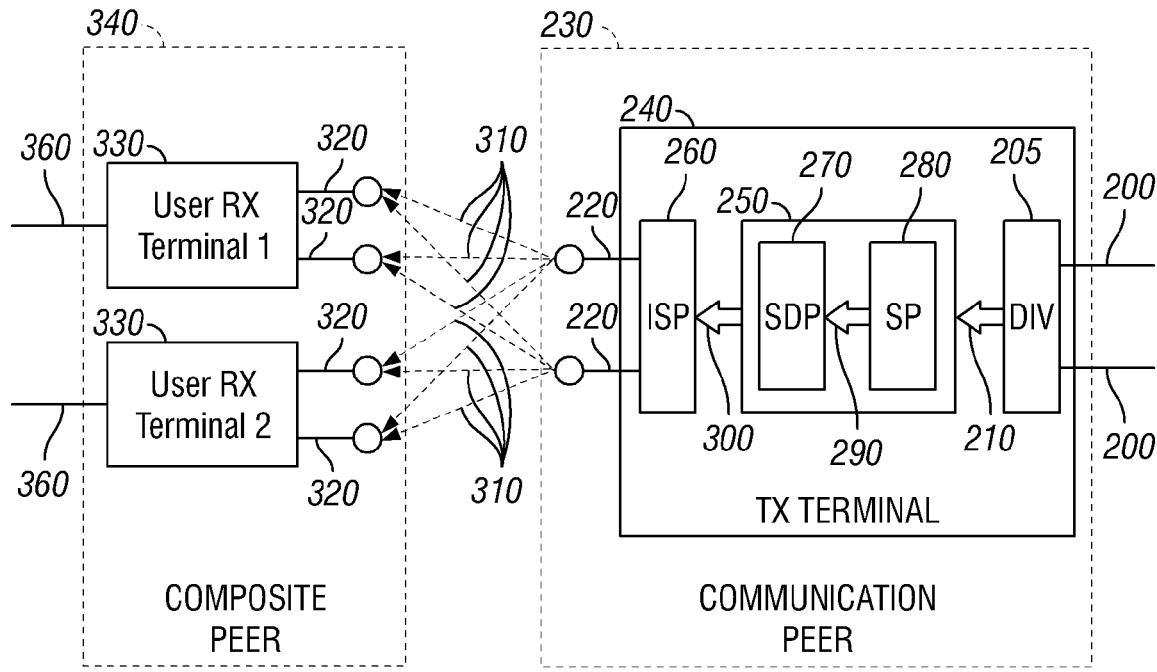
FIG. 1 illustrates a downlink communication set-up.
Figure 1:
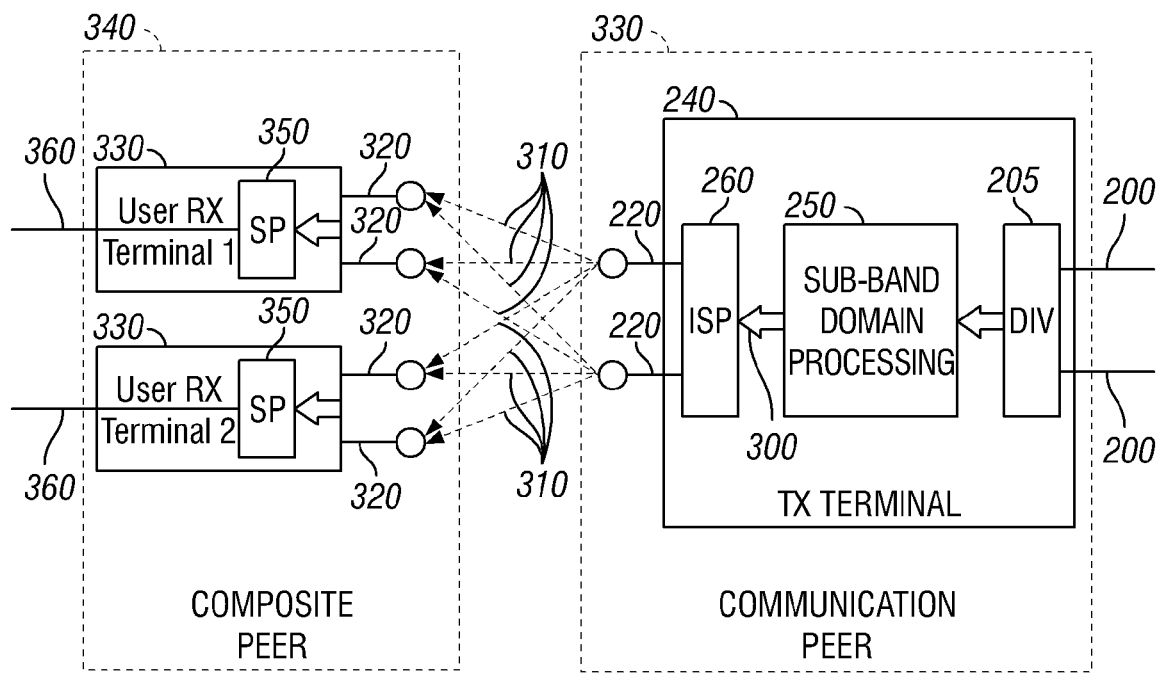
Figure 2:
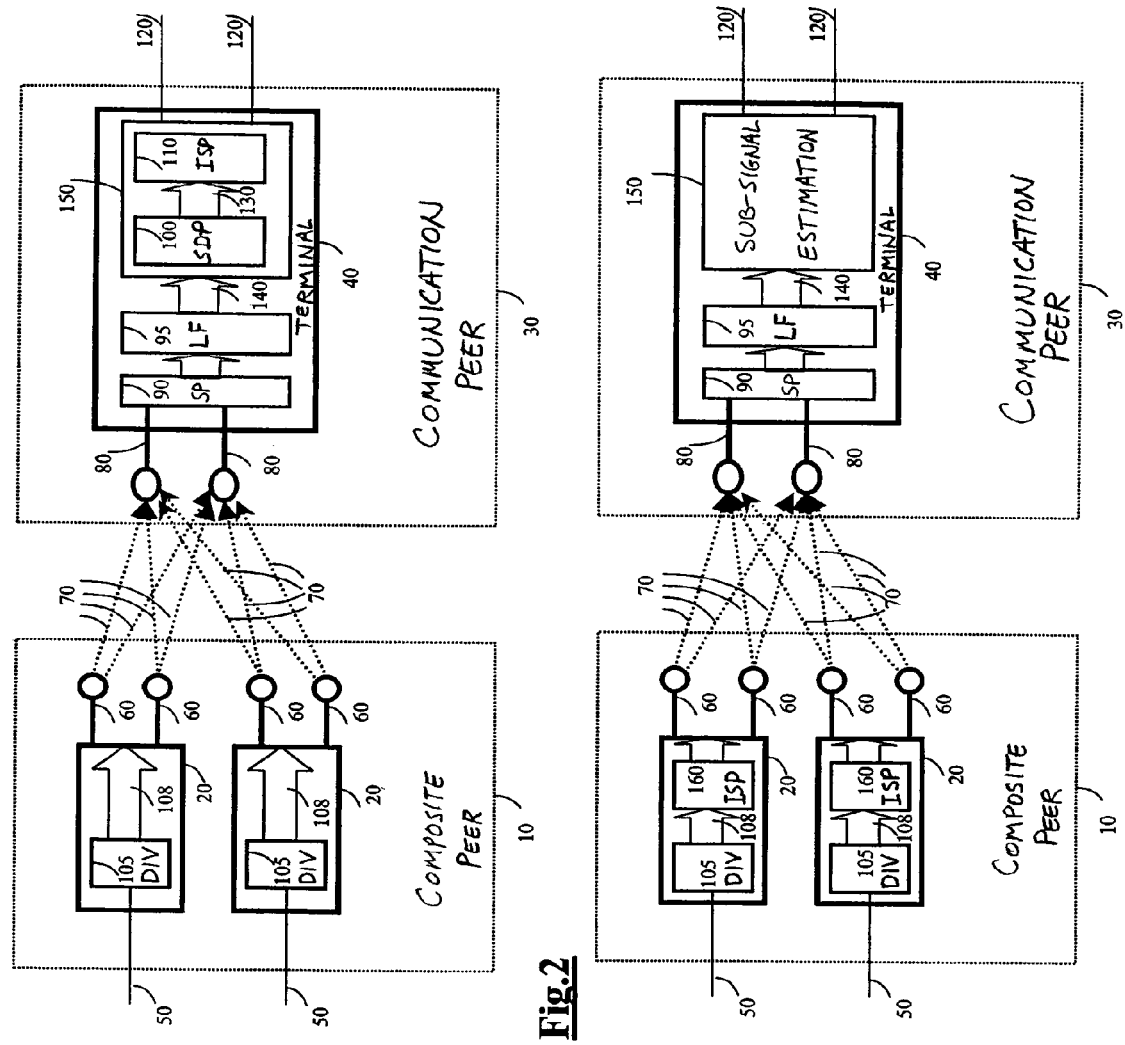
FIG. 2 illustrates an uplink communication set-up.

FIG. 1 illustrates a downlink communication set-up, and FIG. 2 illustrates an uplink communication set-up. Space Division Multiple Access (SDMA) techniques are introduced for systems making use of subband processing, and thus is consistent with a multi-carrier approach. As shown in FIGS. 1 and 2, communication peers 30, 230 include terminal(s) 40, 240 disposing of transmitting and/or receiving devices 80, 220 that are able to provide different spatial samples of the transmitted and/or received signals. These transmission and/or receiving devices are called spatial diversity devices. A peer at the base station side is called a processing peer 30, 230. A processing peer communicates with at least two terminals at an opposite peer 10, 340, which can operate at least partially simultaneously and the communicated signals' spectra can at least partially overlap. Note that Frequency Division Multiple Access techniques rely on signals spectra being non-overlapping while Time Division Multiple Access techniques rely on communicating signals in different time slots thus not simultaneously. The opposite peer(s) includes at least two user terminals 20, 330 (labeled in FIG. 1 as User Terminal 1 and User Terminal 2) using the same frequencies at the same time, and are referred to as the composite peer(s) 10, 340. The systems and methods involve (wireless) communication between terminals whereby at least the processing peer(s) 30, 230 disposes of subband processing capabilities.

The communication between a composite peer and a processing peer can include downlink (FIG. 1) and uplink (FIG. 2) transmissions. Uplink transmission refers to a transmission whereby the composite peer transmits data signals and the processing peer receives data signals. Downlink transmission refers to a transmission whereby the processing peer transmits data signals and the composite peer receives data signals. The uplink and downlink transmissions can be, for example, simultaneous (full duplex) with respect to the channel (for example, using different frequency bands), or they can operate in a time-duplex fashion (half duplex)(for example using the same frequency band), or any other configuration.

A (linear) pre-filter can be used at the transmit side, to achieve a block diagonalization of the channel. At the receiver side (linear) post-filtering can be applied.

(Wireless) transmission of data or a digital signal from a transmitting to a receiving circuit includes digital to analog conversion in the transmission circuit and analog to digital conversion in the receiving circuit. In addition, the apparatus in the communication set-up can have transmission and receiving devices, also referred to as front-end, incorporating these analog-to-digital and digital-to-analog conversions, including amplification or signal level gain control and realizing the conversion of the RF signal to the required baseband signal and vice versa. A front-end can comprise amplifiers, filters and mixers (down converters). As such, in the text all signals are represented as a sequence of samples (digital representation), thereby assuming that the above-mentioned conversion also takes place. This assumption does not limit the scope of the invention though. Communication of a data or a digital signal is thus symbolized as the transmission and reception of a sequence of (discrete) samples. Prior to transmission, the information contained in the data signals can be fed to one or more carriers or pulse-trains by mapping said data signals to symbols which consequently modulate the phase and/or amplitude of the carrier(s) or pulse-trains (e.g., using quadrature amplitude modulation (QAM) or quadrature phase shift keying (QPSK) modulation). The symbols belong to a finite set, which is called the transmitting alphabet. The signals resulting after performing modulation and/or front-end operations on the data signals are called transformed data signals, to be transmitted further.

After reception by the receiving device, the information contained in the received signals is retrieved by transformation and estimation processes. In some embodiments, these transformation and estimation processes can include demodulation, subband processing, decoding and equalization. In other embodiments, these transformation and estimation processes do not include demodulation, subband processing, decoding and equalization. After said estimation and transformation processes, received data signals are obtained, including symbols belonging to a finite set, which is called the receiving alphabet. The receiving alphabet is preferably equal to the transmitting alphabet.

Embodiments of the invention further include methods and systems for measuring the channel impulse responses between the transmission and/or reception devices of the individual user terminals at the composite peer on the one hand, and the spatial diversity device of the processing peer on the other hand. The channel impulse responses measurement can be either obtained on basis of an uplink transmission and/or on basis of a downlink transmission. Thus the measured channel impulse responses can be used by the processing peer and/or composite peer in uplink transmissions and/or in downlink transmissions. This, however, assumes perfect reciprocity between transceiver circuits, which usually is not the case in practice because of, e.g., the different filters being used in transmit and receive path. Additional methods are discussed below to address the non-reciprocity issue. Additional embodiments further include methods for determining the received data signal power and methods for determining the interference ratio of data signals.

The spatial diversity device ensures the reception or transmission of distinct spatial samples of the same signal. This set of distinct spatial samples of the same signal is called a spatial diversity sample. In certain embodiments, spatial diversity devices embody separate antennas. In these embodiments, the multiple antennas belonging to one terminal can be placed spatially apart (as shown in FIGS. 1 and 2), or they can use a different polarization. The multiple antennas belonging to one terminal are sometimes collectively called an antenna array. The systems and methods are maximally efficient if the distinct samples of the spatial diversity sample are sufficiently uncorrelated. In some embodiments, the sufficiently uncorrelated samples may be achieved by placing different antennas apart over a sufficiently large distance. For example, the distance between different antennas can be chosen to be half a wavelength of the carrier frequency at which the communication takes place. Spatial diversity samples are thus different from each other due to the different spatial trajectory from the transmitter to their respective receiver or vice versa. Alternatively, said spatial diversity samples may be different from each other due to the different polarization of their respective receivers or transmitters.

Certain embodiments of the systems and methods rely on the fact that at least the processing peer performs an inverse subband processing, called ISP in the sequel, in the downlink mode (FIG. 1) and subband processing, called SP in the sequel, in the uplink mode (FIG. 2). Furthermore, in the downlink mode, SP takes place either in the composite peer after reception (see FIG. 1, bottom) or in the processing peer before ISP (see FIG. 1, top). In the uplink mode ISP takes place either in the composite peer prior to transmission (see FIG. 2, bottom) or in the processing peer after SP (see FIG. 2, top). Concentrated scenarios refer to the situation where both ISP and SP are in either transmission direction carried out in the processing peer. The remaining scenarios, e.g., where ISP and SP are carried out in different peers in either transmission direction, are referred to as split scenarios.

In addition, the communication methods can transmit data signals from one peer to another peer, but due to transmission conditions, in fact only estimates of the data signals can be obtained in the receiving peer. The transmission methods typically are such that the data signal estimates approximate the data signals as closely as technically possible.

The systems and methods can include downlink transmission methods for communication between a base station and U (>1) user terminals. In some embodiments, a double level of spatial multiplexing is used. This refers to the users being spatially multiplexed (SDMA) and each user receiving spatially multiplexed bit streams (SDM). The methods may further include the steps of (linear) pre-filtering in the base station and possibly (linear) post-filtering in at least one of the user terminals. Substantially simultaneously $C=\Sigma C^u$ independent information signals are sent from the base transceiver station to the U remote transceivers, whereby, for each remote transceiver, the information $C^u$ signals share the same conventional channel. The base transceiver station has an array of N (>1) base station antennas (defining a spatial diversity device). Each of the remote transceivers have an array of $M^u$ (>1) remote transceiver antennas (also defining a spatial diversity device), $M^u$ being terminal specific as each terminals may have different number of antennas. One advantage to such a method is that each of the U remote transceivers is capable of determining a close estimate of the $C^u$ independent information signals, said estimate being constructed from a $M^u$ component signal vector received at the related remote transceivers antenna array. The method comprises the step of dividing each of the C independent signals into a plurality of streams of $C^u$ sub-signals and computing an N-component transmission vector U as a weighted sum of C N-component vectors $V_p$, wherein the sub-signals are used as weighting coefficients.

Alternatively formulated, this aspect discloses a method for transmitting user specific data signals from at least one transmitting terminal 240 with a spatial diversity capability 220 to at least two receiving terminals 330 with a spatial diversity capability 320. The method comprises: dividing 205 the user data signals 200 into a plurality of streams of sub-user data sub-signals 210; determining 250 combined data signals 300 in the transmitted signals, whereby the combined data signals are transformed versions of the streams of sub-user data sub-signals 210, such that at least one of said spatial diversity device 320 of said receiving user terminals only receives data sub-signals being specific for the corresponding receiving user terminal (in other embodiments, 'at least one' can be understood to mean 'substantially all'); inverse subband processing 260 the combined data signals 300; transmitting with the transmitting terminal spatial diversity device 220 the inverse subband processed combined data signals; receiving on at least one of the spatial diversity receivers 320 of at least one of the receiving terminals 330 received data signals; determining on at least one of said receiving terminals 330 estimates of the specific user data sub-signals from the received data signals; and collecting said estimates of the data sub-signals into estimates of the data signals.

A transmit pre-filter in the base station can be used to achieve a block diagonalization of the channel, resulting in a substantially zero multi-user interference. In this embodiment, each terminal then only has to eliminate its own interstream interference, which does not require information from the other users' channels. The vectors $V_i$ are selected such that the $M^u$ component signal vector received by the antennas of a particular remote transceiver substantially only contain signal contributions directly related to the $C^u$ sub-signals of the original information signal that the remote transceiver should reconstruct. Determining combined data signals is essentially based on the distinct spatial signatures of the transmitted combined data signals (SDMA) and is such that the spatial diversity capability of a terminal receive the sub-data signals specific for the user of that terminal. This approach can be exploited in a multi-user SDMA MIMO TX-RX optimization context, which results in a decoupling of this overall optimization into several single user optimizations, where each optimization depends on a single-user MIMO channel. The close estimate of one of the $C^u$ independent information signals is constructed from the M component signal vector received at the related remote transceivers antenna array by using the steps comprising: selecting M component vectors $P_i$ and computing an $M^u$ component receive vector as a weighted sum of the $M^u$ component vectors $P_i$ wherein the components of the $M^u$ component signal vector are used as weighting coefficients. Thereafter, the components of the obtained weighted sum are combined in order to obtain the desired estimate. The vector $V_i$, $P_i$ can be determined in a joint MMSE optimization scheme, independently for each remote terminal.

The transmission can be done substantially simultaneously. The spectra of the (transmitted) inverse subband processed combined data signals can be at least partly overlapping.

In the downlink split scenario, the determination of the data sub-signal estimates in the receiving terminals comprises subband processing 350 as shown in FIG. 1. In the downlink concentrated scenario determining 250 combined data signals in the transmitting terminal comprises: determining intermediate combined data signals 290 by subband processing 280 the data sub-signals 210, and determining 270 the combined data signals from the intermediate combined data signals.

Also included are uplink transmission methods for communication between U (>1) user terminals and a base station. As in the downlink case, a double level of spatial multiplexing may be used (SDMA-SDM). The methods further include the steps of pre-filtering in at least one of the transmitting user terminals and post-filtering in the base station. Substantially simultaneously $C = \Sigma C^u$ independent information signals are sent from the U user terminals to the base transceiver station, whereby, for each user terminal, the information $C^u$ signals share the same conventional channel. Each of the user terminals have an array of $M^u$ (>1) transmit antennas (also defining a spatial diversity device), $M^u$ being terminal specific as each terminal may have different number of antennas. The base transceiver station has an array of N (>1) base station antennas (defining a spatial diversity device). In this way, the base station may be capable of determining a close estimate of the $C^u$ independent information signals, said estimate being constructed from a N component signal vector received at the base station antenna array. The method further comprises the step of dividing each of the C independent signals into a plurality of streams of $C^u$ sub-signals and computing a $M^u$-component transmission vector as a weighted sum of C $M^u$-component vectors, wherein the sub-signals are used as weighting coefficients.

Certain embodiments include a method of transmitting data signals 50 from at least two transmitting terminals 20, each provided with spatial diversity transmitter 60 to at least one receiving terminal 40 with a spatial diversity receiver 80, comprising: dividing 105 said data signals 50 into a plurality of streams of (sub-user) data sub-signals 108; transforming versions of said streams of said data sub-signals 108 into transformed data signals 108; transmitting from said transmitting terminals 20 said transformed data signals 70; receiving on said spatial diversity receiving device 80 received data signals being at least function of at least two of said transformed data signals 70; subband processing 90 of at least two of said received data signals in said receiving terminal 40; applying a linear filtering 95 on said subband processed received data signals, said linear filtering and said transforming being selected such that the filtered subband processed received data signals are specific for one of said transmitting terminals; determining 150 estimates of said data sub-signals 120 from said filtered subband processed received data signals 140 in said receiving terminal; and collecting said estimates of said data sub-signals into estimates of said data signals. This can comprise a joint detection operation, for example, a State Insertion Cancellation.

In certain embodiments, the transformed data signals can be transmitted substantially simultaneously. The spectra of the transformed data signals can be at least partly overlapping.

In the uplink split scenario the transformation of the data sub-signals 108 (see FIG. 2) to transformed data signals 70 comprises inverse subband processing 160. In the uplink concentrated scenario, the determination 150 of data sub-signal estimates from the obtained subband processed received data signals in the receiving terminal comprises the steps of: determining 100 intermediate estimates 130 of the data sub-signals from the subband processed received data signals in the receiving terminal; obtaining the estimates of the data sub-signals 120 by inverse subband processing 110 the intermediate estimates.

It is a characteristic of some embodiments that said transmission methods are not a straightforward concatenation of a Space Division Multiple Access technique and a multi-carrier modulation method. The methods for multi-user MIMO transmission include the use of a double level of spatial multiplexing. For example, the users may be spatially multiplexed (SDMA) and each user can receive spatially multiplexed bit streams (SDM). Further, said method includes the steps of pre-filtering in the transmitting station and post-filtering in at least one of said receive terminals.

Some embodiments implement a multicarrier modulation technique. An example of such a multicarrier modulation technique uses Inverse Fast Fourier Transform algorithms (IFFT) as ISP and Fast Fourier Transform algorithms (FFT) as SP, and the modulation technique is called Orthogonal Frequency Multiplexing (OFDM) modulation. It can be stated that in the uplink transmission method, the subband processing is orthogonal frequency division demultiplexing. It can also be stated that in the uplink transmission method, the inverse subband processing is an orthogonal frequency division multiplexing. It can also be stated that in the downlink transmission method, the subband processing is orthogonal frequency division demultiplexing. It can also be stated that in the downlink transmission method, the inverse subband processing is orthogonal frequency division multiplexing.

In concentrated scenarios, the processing that is carried out in the processing peer on samples between SP 90 280 (see FIGS. 1 and 2) and ISP 110 260 is called subband domain processing 270 100. In split scenarios, the processing that is carried out prior to ISP 160 260 in the transmitting terminals and after SP 90 350 in the receiving terminals, is called subband domain processing (e.g., item numeral 250 in FIG. 1). "Prior to ISP" refers to occurring earlier in time during the transmission or the reception, and the term "after SP" refers to occurring later in time during the transmission or the reception. In concentrated scenarios, the signals 130 140 290 300 (as shown in FIGS. 1 and 2) between the SP and the ISP are called signals in subband domain representation. In split scenarios, the signals 50 300 200 before the ISP in the transmitting terminals and the signals 360 140 120 after the SP in the receiving terminals are called signals in a subband domain representation.

In certain embodiments, the subband processing consists of Fast Fourier Transform (FFT) processing and the inverse subband processing consists of Inverse Fast Fourier Transform (IFFT) processing. FFT processing refers to taking the Fast Fourier Transform of a signal. Inverse FFT processing refers to taking the Inverse Fast Fourier Transform of a signal.

The transmitted sequence can be divided in data subsequences prior to transmission. The data subsequences correspond to subsequences that are processed as one block by the subband processing device. In case of multipath conditions, a guard interval containing a cyclic prefix or postfix is inserted between each pair of data subsequences in the transmitting terminal(s). If multipath propagation conditions are experienced in the wireless communication resulting in the reception of non-negligible echoes of the transmitted signal and the subband processing capability consists of (an) FFT and/or IFFT operation(s), this guard introduction results in the substantial equivalence between convolution of the time-domain data signals with the time-domain channel response on the one hand and multiplication of the frequency-domain data-signals with the frequency-domain channel response on the other hand. The insertion of the guard intervals can occur in both concentrated and split scenarios. Thus in certain embodiments of a split scenario, the transmitting terminal(s) insert guard intervals containing a cyclic prefix or postfix between each pair of data subsequences after performing ISP on the data subsequences and before transmitting the data subsequences. In another embodiment of a concentrated scenario, the guard intervals are inserted in the transmitted sequence between each pair of data subsequences without performing ISP on the data subblocks in the transmitting terminal(s). This can be formalized as follows by stating that in the uplink transmission methods the transformation of the data signals to transmitted data signals further comprises guard interval introduction. The guard interval introduction can be applied in the downlink transmission methods. Alternatively overlap and save techniques can be utilized also.

The terminal(s) disposing of the spatial diversity device dispose(s) of SP and/or ISP capability that enable subband processing of the distinct samples of the spatial diversity sample. Also, it disposes of the capability for combinatory processing. Combinatory processing refers to process data coming from subbands of the distinct samples in the spatial diversity sample. In the combinatory processing, different techniques can be applied to retrieve or estimate the data coming from the different distinct terminals or to combine the data to be transmitted to distinct terminals. Embodiments include methods for performing the combinatory processing, both for uplink transmission and for downlink transmission.

Combinatory processing in the downlink includes a communication situation whereby the peer disposing of spatial diversity capability, which is referred to as the processing peer, transmits signals to the composite peer, which embodies different terminals transmitting (at least partially simultaneous) so-called inverse subband processed combined data signals (having at least partially overlapping spectra). Determining 250 (see FIG. 1) combined data signals 300 in the transmitting terminal in the downlink transmission method refers to the combinatory processing.

Combinatory processing in the uplink includes a communication situation whereby the peer disposing of spatial diversity capability, which is referred to as the processing peer, receives signals from the composite peer, which embodies different terminals transmitting (at least partially simultaneous) transformed data signals (having at least partially overlapping spectra). The determination of estimates of the data sub-signals 120 (see FIG. 2) from the subband processed received data signals 140 in said receiving terminal in the uplink transmission method refers to the combinatory processing.

The downlink transmission methods are now discussed in more detail. Consider therefore a base station (BS) with A antennas and U simultaneous user terminals (UT) each having Bu ($M^u$) antennas. The BS simultaneously transmits several symbol streams towards the U UTs: C1 streams towards UT1, C2 streams towards UT2, and so on. Each user terminal $UT^u$ receives a mixture of the symbol streams and attempts to recover its own stream of $C^u$ symbols. To this end, each UT can be fitted with a number of antennas $B^u$ greater than or equal to $C^u$ ($B^u \geq C^u$). This transmission scheme can be referred to as SDM-SDMA: SDMA achieves the user separation and SDM achieves the per-user stream separation. The model is typically used for flat fading channels, but it also applies to frequency selective channels with multi-carrier transmission (e.g., OFDM), where flat fading conditions prevail on each sub-carrier.

Figure 3:
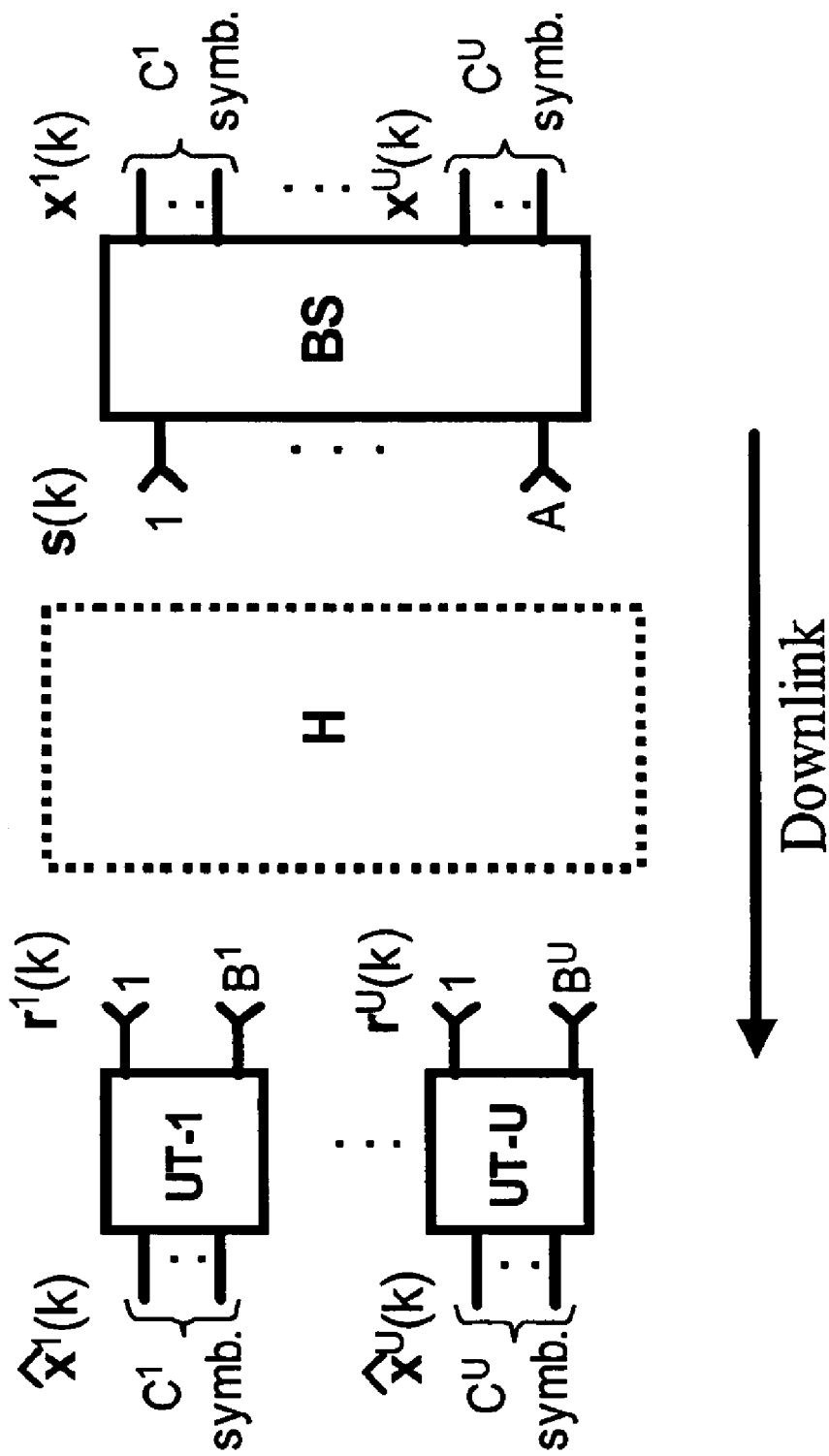
FIG. 3 illustrates the multi-user (U>1), MIMO (A>1, $B^u \geq 1$), multi-stream ($C^u \geq 1$) context of the systems and methods.

FIG. 3 illustrates the set-up (the downlink transmission is illustrated from right to left). In the embodiment of FIG. 3, at each time instant k, the BS transmits the signal vector s(k) obtained by pre-filtering the symbol vector x(k), which itself results from stacking the U symbol vectors $x^u(k)$ as follows (vectors are represented as boldface lowercase and matrices as boldface uppercase; the superscript T denotes transpose):

$$s(k)=[s_1(k) \ldots s_A(k)]^T = F \cdot x(k)$$

$$x(k)=[x^1(k)^T \ldots x^U(k)^T]^T$$

$$x^u(k)=[x_1^u(k) \ldots x_{C^u}^u(k)]^T \quad \text{(formula 1)}$$

Assuming flat fading, the signal received by the $u^{th}$ terminal can be written as follows:

$$r^u(k) = H^u \cdot s(k) + n^u(k) \quad \text{(formula 2)}$$

where Hu are the Bu rows of the full channel matrix H. In other words, Hu is the MIMO sub-channel from the BS to user u. The full channel matrix H has dimension $$\left(\sum_{u=1}^{U} B^u\right) \times A.$$

Each user applies a linear post-filter Gu to recover an estimate of the transmitted symbol vector xu(k):

$$\hat{x}^u(k) = G^u \cdot r^u(k) \quad \text{(formula 3)}$$
$$= G^u \cdot H^u \cdot F \cdot x(k) + G^u \cdot n^u(k)$$

Note that x(k) contains the symbols of all U users, hence MUI can cause severe signal-to-noise ratio degradation if not properly dealt with.

In order to zero out the MUI, in some embodiments the F matrix is designed such that it block diagonalizes the channel, e.g., the product H·F is block diagonal with the $u^{th}$ block in the diagonal being of dimension $B^u \times B^u$. This ensures that, under ideal conditions, the MUI is substantially eliminated, leaving primarily per-user multi-stream interference, which will be tackled by a per-user processing.

First, it is noted that H is the vertical concatenation of the U "BS-to-user-u" matrices $H^u$ and F is the horizontal concatenation of the U pre-filtering matrices $F^u$:

$$H = [H^{1^T} \ldots H^{U^T}]^T$$

$$F = [F^1 \ldots F^U] \quad \text{(formula 4)}$$

The block-diagonalization condition is fulfilled if each $F^u$ is chosen so that its columns lie in the null-space of $H_C^u$ where $H_C^u$ is obtained by removing from H the $B^u$ rows corresponding to user u (so $Hc^u$ has $$\sum_{k=1, k \neq u}^{U} B^k$$

rows):

$$F^u \in \text{null}\{H_C^u\} \Leftrightarrow H_C^u \cdot F^u = O \quad \text{(formula 5)}$$

To achieve this, matrix N is introduced which is built as follows: $N^1$, the first columns of N, is an orthogonal basis for the null space of $H_C^1$; the other columns of N are built in the same way for user 2 to U: $N=[N^1 \ldots N^u]$. It is easy to see that each $N^u$ has $D^u$ columns where $D^u$ is given by:

$$D^u = A - \sum_{k=1, k \neq u}^{U} B^k \quad \text{(formula 6)}$$

Matrix F is defined as N·E where E is also block diagonal with blocks of dimension $B^u \times C^u$. This constrains F to be, per user u, a linear combination of $N^u$ which indeed block diagonalizes the full channel matrix. These linear combinations are contained in the sub-blocks that make up the E matrix.

Figure 4:
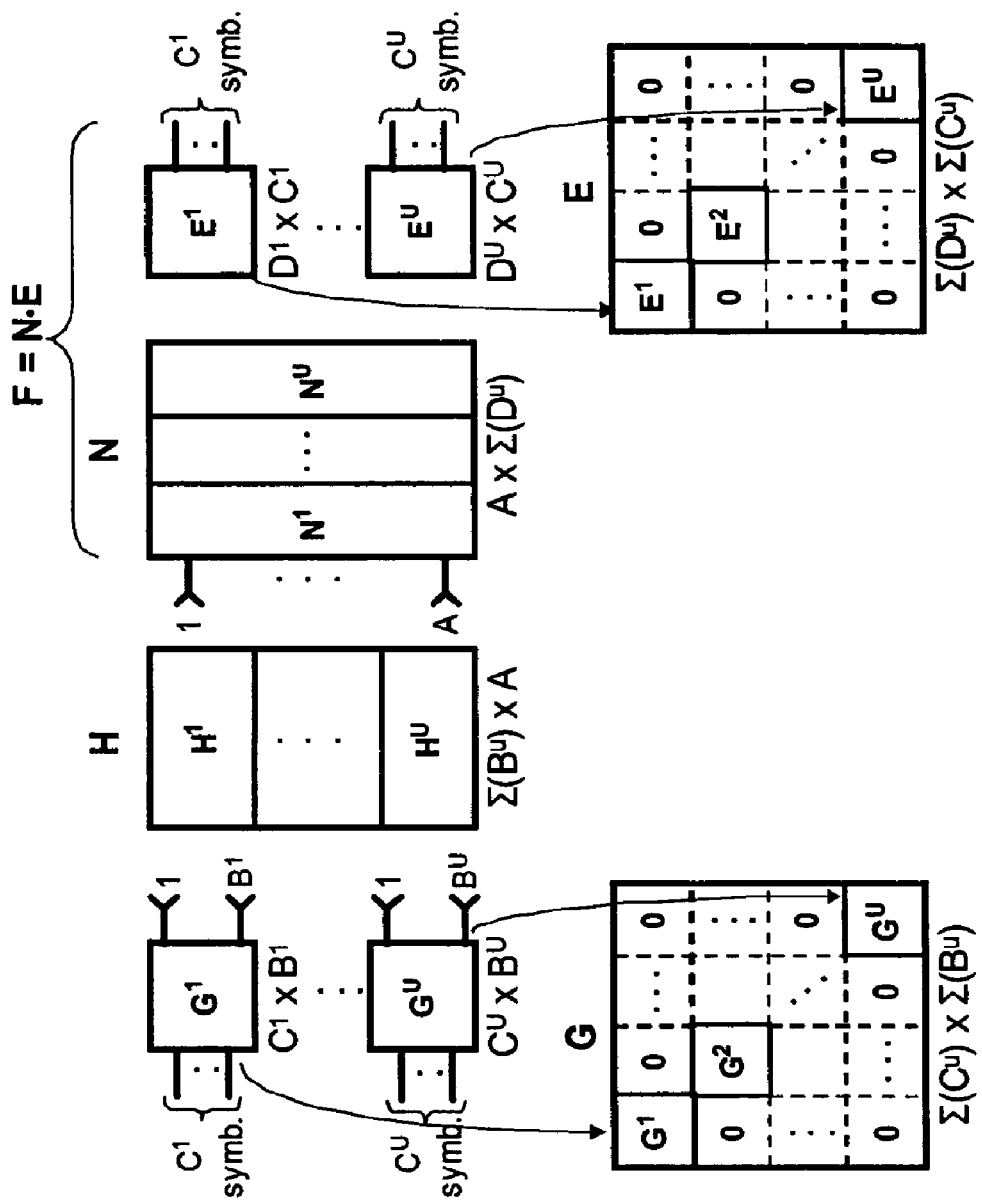
FIG. 4 illustrates the involved matrices.

Matrix G is similarly designed as a block diagonal matrix where each block has dimension $C^u \times B^u$. FIG. 4 illustrates the various matrices used together with their dimensions. Globally, this strategy is advantageous because the pre- and post-filtering (F and G) can be calculated independently per user. Zeroing the MUI is also advantageous to combat near-far effects.

In certain embodiments, the requirements on the number of antennas are as follows:

$$\left. \begin{array}{l} B^u \geq C^u \\ A - \sum_{k=1, k \neq u}^{U} B^k \geq C^u \end{array} \right\} \text{ for all } u \quad \text{(formula 7)}$$

Within these limits, the scheme can accommodate terminals with different numbers of antennas, which is an additional advantageous feature.

A joint TX-RX MMSE optimization scheme is modified and extended to take the block diagonalization constraint into account. To this end, the joint TX-RX optimization per user is computed for a MUI free channel: the optimization is performed over channel $H^u \cdot N^u$ for user u. One has the following constrained minimization problem, with $P^u$ denoting the transmit power of user u and the superscript H the Hermitian transpose:

$$\min_{E^u, G^u} E[\|x^u(k) - \hat{x}^u(k)\|_2^2] \text{ s.t. } \text{trace}(F^{uH} F^u) = P^u \quad \text{(formula 8)}$$

$$\min_{E^u, G^u} E[\|x^u(k) - G^u(H^u N^u E^u x^u(k) + n^u(k))\|_2^2]$$

$$\text{s.t. } \text{trace}(E^{uH} N^{uH} N^u E^u) = P^u$$

The constrained optimization is transformed into an unconstrained one using the Lagrange multiplier technique. Then, one can minimize the following Lagrangian:

$$L(\mu, E^u, G^u) = E[\|x^u(k) - G^u(H^u N^u E^u x^u(k) + n^u(k))\|_2^2] + \lambda^u(\text{trace}(E^{uH} N^{uH} N^u E^u) - P^u) \quad \text{(formula 9)}$$

where $\lambda^u$ is a parameter that has to be selected to satisfy the power constraint. Following an approach similar to [H. Sampath, P. Stoica and A. Paulraj, "Generalised Linear Precoder and Decoder Design for MIMO Channels Using the Weighted MMSE Criterion", IEEE Transactions on Communications, Vol. 49, No. 12, December 2001] and using the singular value decomposition (SVD) of $H^u \cdot N^u$, one obtains the following transmit and receive filters $F^u$ and $G^u$, per user:

$$H^u N^u = U_{HN}^u \Sigma_{HN}^u (V_{HN}^u)^H \quad \text{(formula 10)}$$

$$(\Sigma_E^u)^2 = \left( \frac{\sigma}{\sqrt{\lambda}} (\Sigma_{HN}^u)^{-1} - \sigma^2 (\Sigma_{HN}^u)^{-2} \right)_+$$

$$F^u = N^u E^u = N^u V_{HN}^u \Sigma_E^u$$

$$G^u = (\Sigma_E^u \Sigma_{HN}^u)^{-1} (U_{HN}^u)^H$$

where $(.)_+$ indicates that only the non-negative values are acceptable and, in the last line, only the non-zero values of the diagonal matrix are inverted.

To illustrate the performance of the proposed SDMA-MIMO scheme, a typical multi-user MIMO situation is considered first where a BS equipped with 6 to 8 antennas is communicating with three 2-antenna UTs. Hence, this set-up has 3×2=6 simultaneous symbol streams in parallel. The 3 input bit streams at the BS are QPSK modulated and demultiplexed into 2 symbol streams each. Each symbol stream is divided in packets containing 480 symbols and 100 channel realizations are generated. The entries of matrix H are zero mean independent and identically distributed (iid) Gaussian random variables with variance 1 and are generated independently for each packet. The total transmit power per symbol period across all antennas is normalized to 1.

Figure 5:
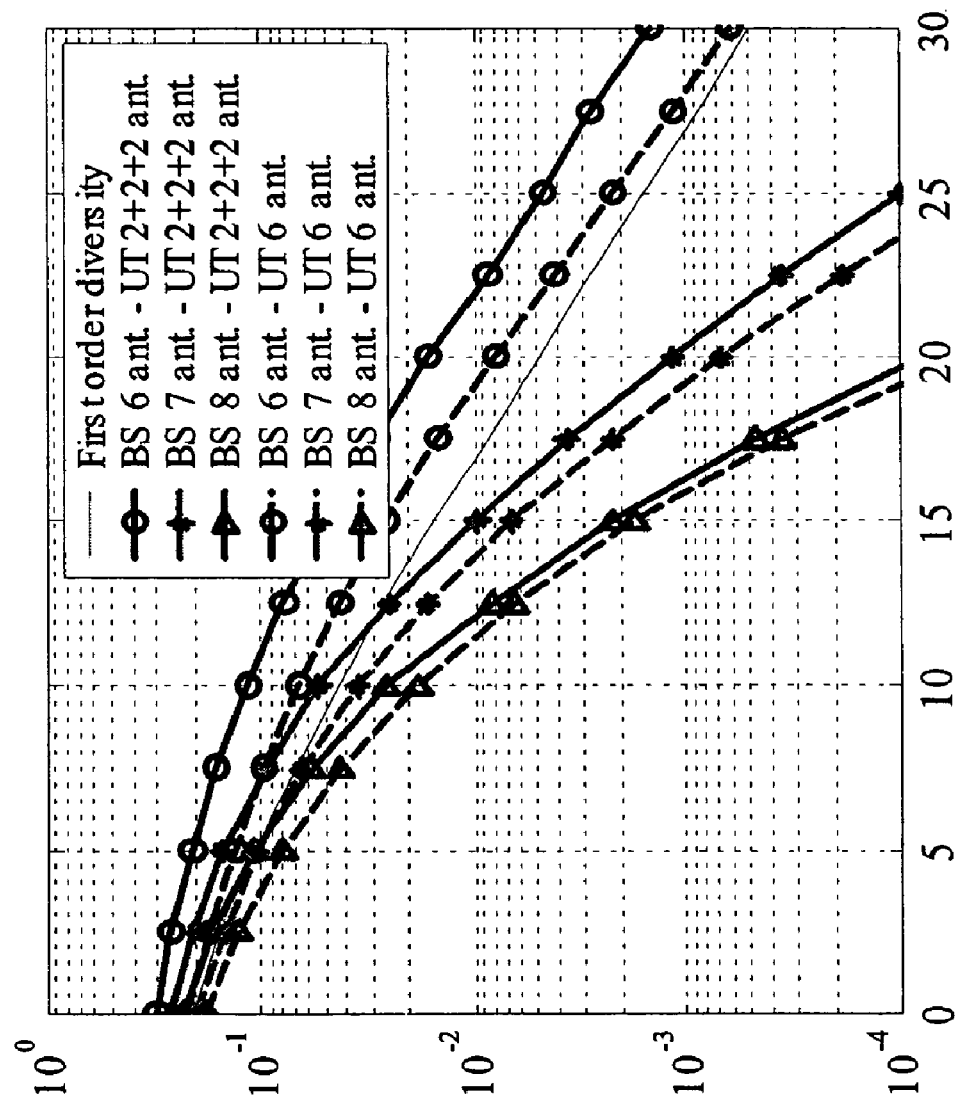
FIGS. 5 and 6 illustrate simulations results for the block diagionalization approach used in the context of joined transmit and receive filter optimization.

FIG. 5 shows the performance of the proposed SDMA-MIMO system for the joint TX-RX MMSE design in solid line. Also shown in dotted line is the performance of a conventional single user MIMO system with the same number of antennas (6 to 8 antennas for the BS, 6 antennas for the UT). The scenario where the BS has 6 antennas is the fully loaded case: adding more parallel streams would introduce irreducible MUI. The scenarios where the BS has more than 6 antennas are underloaded and some diversity gain is expected. The single user system typically has a better performance since it has more degrees of freedom available at the receiver for spatial processing (for the conventional case, the receive filter matrix is 6×6 while for our multi-user MIMO case the 3 receive filter matrices are 2×2). An advantageous feature of the proposed SDMA MIMO system is that adding just one antenna at the BS provides a diversity gain of 1 to all simultaneous users. Also, the difference between single user and multi-user performance becomes negligible when the number of BS antennas increases.

Figure 6:
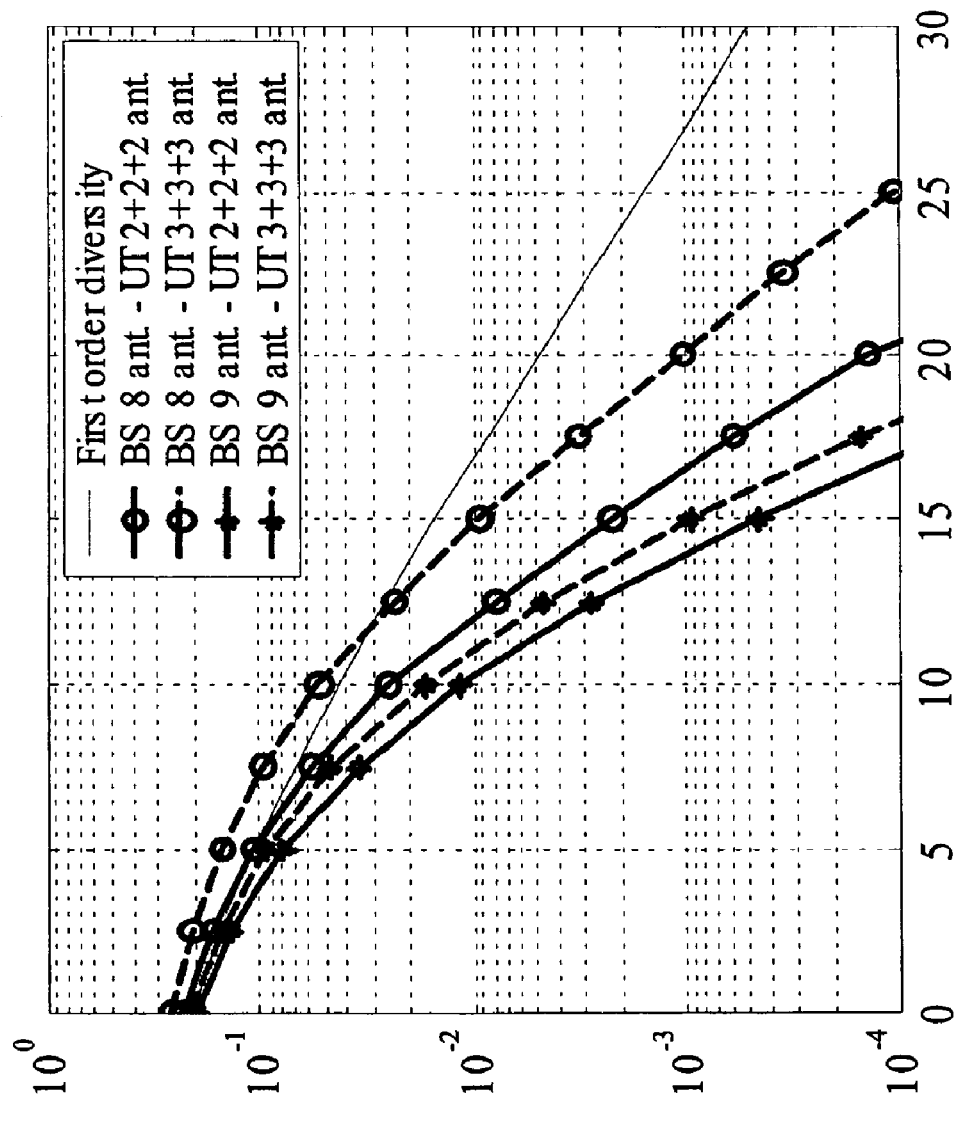

Next, the case is considered of an increased number of antennas at the user terminal. Two symbol streams are sent to each terminal and the terminals have 3 antennas (same number at each terminal). The BS has 8 or 9 antennas to satisfy the requirement in formula (7). For comparison, 2 antennas at the UTs have also been simulated. All other parameters are substantially identical to those of the first simulation scenario. The simulation results are shown in FIG. 6. As expected, increasing the number of BS antennas from 8 to 9 provides a diversity improvement. However, increasing the number of receive antennas results in a reduced performance. This counter-intuitive result is due to the fact that the higher number of receive antennas reduces the number of columns of N and, hence, the apparent channel dimension over which the MMSE optimization takes place. More specifically, for 8 antennas at the BS, one has the matrix dimensions given in FIG. 7. It can be seen that the actual channel ($H^u \cdot N^u$) available for per-user TX-RX MMSE optimization is smaller when the number of RX antennas is large. The BER curves corresponding to these two cases match closely with the BER curves of joint TX-RX MMSE optimization of a 2×4 and 3×2 MIMO system respectively, with a correction of $10 \log_{10}(3) = 4.8$ dB.

This correction is due to the power being divided between three users in this exemplary SDMA MIMO system.

An SDMA MIMO scheme was proposed that allows to block-diagonalize the MIMO channel so that the MUI is completely cancelled. It was applied to a joint TX-RX MMSE optimization scheme with transmit power constraint. This design generally results in smaller per user optimization problems. The highest—and most economical—performance increase is shown to be achieved by increasing the number of antennas at the base station side. Increasing the number of antennas at the terminals beyond the number of parallel streams must be done carefully. This block diagonalization is very advantageous for MIMO-SDMA. In this context, it can be applied to a large range of schemes, including linear and non-linear filtering and optimizations, TX-only, RX-only or joint TX-RX optimization. It is also applicable for uplink and downlink. Extension to frequency selective channels is straightforward with multi-carrier techniques such as OFDM.

Consider an approach based on the assumption that the channel is slowly varying and hence channel state information can be acquired through either feedback or plain channel estimation in TDD-based systems and consider among the possible design criteria, the joint transmit and receive Minimum Mean Squared Error (Tx/Rx MMSE) criterion, for it is the optimal linear solution for fixed coding and modulation across the spatial subchannels. Note that the latter constraint is set to reduce the system's complexity and adaptation requirements in comparison to the optimal yet complex bit loading strategy. For a fixed number of spatial streams p and fixed symbol modulation, this design devises an optimal filter-pair (T,R) that decouples the MIMO channel into multiple parallel spatial subchannels. An optimum power allocation policy allocates power only to a selection of subchannels that are above a given Signal-to-Noise Ratio (SNR) threshold imposed by the transmit power constraint. Furthermore, more power is given to the weaker modes of the previous selection, and vice versa. It is clear that the data-streams assigned to the non-selected spatial subchannels are lost, giving rise to a high MMSE and consequently a non-optimal Bit-Error Rate (BER) performance. Moreover, the arbitrary and initial choice of the number of streams p leads to the use of weak modes that consume most of the power. The previous remarks show the impact of the choice of p on the power allocation efficiency as well as on the BER performance of the joint Tx/Rx MMSE design. Hence, it is relevant to consider the number of streams p as an additional design parameter rather than as a mere arbitrary fixed scalar.

In this further aspect of the systems and methods, the issue is addressed of optimizing the number of streams p of the joint Tx/Rx MMSE under fixed total average transmit power and fixed rate constraints for flat-fading MIMO channels in both a single user and multi-user context.

Figure 8:
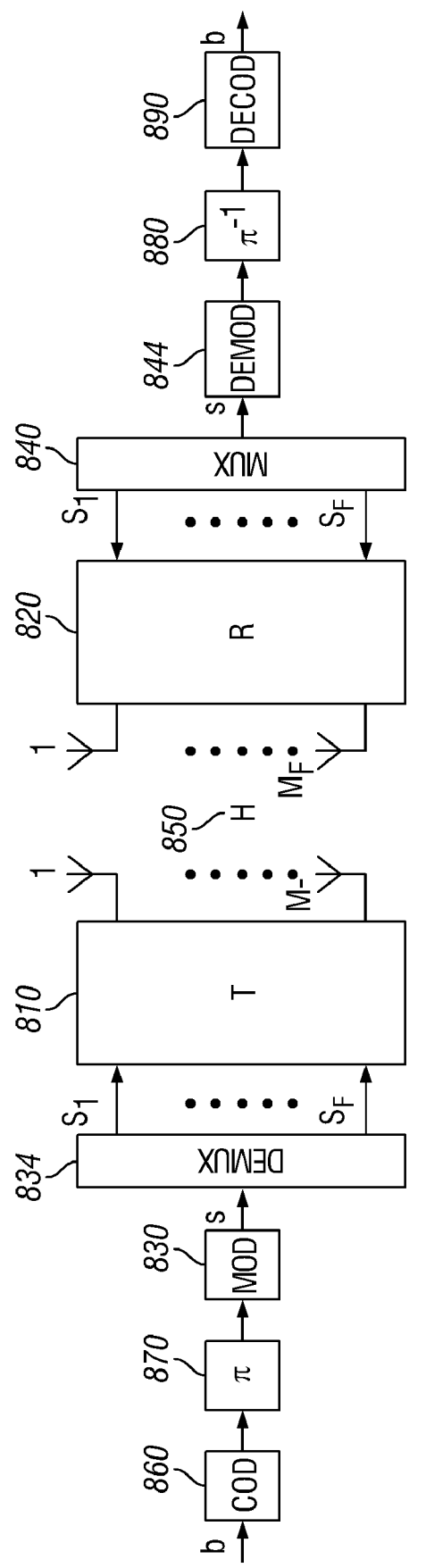
FIG. 8 illustrates a Spatial Multiplexing MIMO System.

The considered point-to-point SM MIMO communication system is depicted in FIG. 8. It represents a transmitter (Tx) and a receiver (Rx), both equipped with multiple antennas. The transmitter first modulates 830 the signal received from coder (COD) 860 and interleaver (II) 870 and transmits bit-stream b according to a pre-determined modulation scheme (this implies the same symbol modulation scheme over all spatial substreams), then it demultiplexes 834 the output symbols into p independent streams. This spatial multiplexing modulation actually converts the serial symbol-stream s into p parallel symbol streams or equivalently into a higher dimensional symbol stream where every symbol now is a p-dimensional spatial symbol, for instance s(k) at time k. These spatial symbols are then pre-filtered by the transmit filter T 810 and sent onto the MIMO channel through the $M_T$ transmit antennas. At the receive side, the $M_R$ received signals are post-filtered by the receive filter R 820. The p output streams conveying the detected spatial symbols ŝ(k) are then multiplexed 840 and demodulated 844 to recover the initially transmitted bit-stream after being fed through deinterleaver ($\Pi^{-1}$) 880 and decoder (DECOD) 890. For a flat-fading MIMO channel, the global system equation is given by $$\underbrace{\begin{bmatrix} \hat{s}_1(k) \\ \vdots \\ \hat{s}_p(k) \end{bmatrix}}_{\hat{s}(k)} = R \cdot H \cdot T \cdot \underbrace{\begin{bmatrix} s_1(k) \\ \vdots \\ s_p(k) \end{bmatrix}}_{s(k)} + R \cdot \underbrace{\begin{bmatrix} n_1(k) \\ \vdots \\ n_{M_R}(k) \end{bmatrix}}_{n(k)} \quad \text{(formula 11)}$$

where n(k) is the $M_R$-dimensional receive noise vector at time k and H 850 is the ($M_R \times M_T$) channel matrix whose $(i,j)^{th}$ entry, $h_j^i$, represents the complex channel gain from the $j^{th}$ transmit antenna to the $i^{th}$ receive antenna. In the sequel, the sampling time index k is dropped for clarity.

The transmit and receive filters T 810 and R 820, represented by a ($M_T \times p$) and ($p \times M_R$) matrix respectively, are jointly designed to minimize the Mean Squared Error (MMSE) subject to average total transmit power constraint as stated in:

$$\begin{cases} \text{Min}_{R,T} & E\{\|s - (RHTs + Rn)\|_2^2\} \\ \text{subject to:} & \text{trace}(TT^H) = P_T \end{cases} \quad \text{(formula 12)}$$

The statistical expectation E{ } is carried out over the data symbols s and noise samples n. Moreover, uncorrelated data symbols and uncorrelated zero-mean Gaussian noise samples with variance $\sigma_n^2$ are assumed so that one has $$E(ss^H) = I_p, E(nn^H) = \sigma_n^2 I_{M_R}, E(sn^H) = 0 \quad \text{(formula 13)}$$

The trace constraint states that the average total transmit power per p-dimensional spatial symbol s after pre-filtering with T equals $P_T$.

Let $H = U \cdot \Sigma_p \cdot V^*$ be the Singular Value Decomposition (SVD) of the equivalent reduced channel corresponding to the p selected subchannels over which the p spatially multiplexed data-streams are to be conveyed. Considering the equivalent reduced channel corresponding to the p selected subchannels allows the reduction of the later introduced St and Sr to their diagonal square principal matrices as one gets rid of their unused null-part corresponding to the (MR-p) remaining and unused subchannels. These p spatial subchannels are represented by $\Sigma_p$, which is a diagonal matrix containing the first strongest p subchannels of the actual channel H. The optimization problem stated in formula 12 is solved using the Lagrange multiplier technique and leads to the optimal filter-pair (T,R):

$$\begin{cases} T = V \cdot \Sigma_t \\ R = \Sigma_r \cdot U^H \end{cases} \quad \text{(formula 14)}$$

where $\Sigma_t$ is the (p×p) diagonal power allocation matrix that determines the power distribution among the p spatial subchannels and is given by $$\begin{cases} \Sigma_t^2 = \left[\dfrac{\sigma_n}{\sqrt{\lambda}}\Sigma_p^{-1} - \sigma_n^2\Sigma_p^{-2}\right]^+ \\ \text{subject to: } \operatorname{trace}(\Sigma_t^2) = P_T \end{cases}$$ (formula 15)

The complementary equalization matrix $\Sigma_r$ is the (p×p) diagonal matrix given by:

$$\Sigma_r = \dfrac{\sqrt{\lambda}}{\sigma_n}\Sigma_t$$ (formula 16)

where $[x]^+ = \max(x,0)$ and $\lambda$ is the Lagrange multiplier to be calculated to satisfy the trace constraint of formula 15. The filter-pair MMSE solution (T, R) of formula 14 clearly decouples the MIMO channel matrix H 850 into p parallel subchannels. Among the latter available subchannels, those above a given SNR threshold, imposed by the transmit power constraint, are allocated power as described in formula 15. Furthermore, more power is allocated to weaker modes of the previous selection and vice-versa leading to an asymptotic zero-forcing behavior as subsequently shown:

$$RHT = \left[\dfrac{\sigma_n}{\sqrt{\lambda}}\Sigma_p^{-1} - \sigma_n^2\Sigma_p^{-2}\right]\cdot\dfrac{\sqrt{\lambda}}{\sigma_n}\Sigma_p \to I_p \text{ when } \sigma_n \to 0$$ (formula 17)

The above-described Tx/Rx MMSE design is derived for a given number of streams p, which is arbitrary chosen and fixed. Hence, the filter-pair solution can be accurately denoted as $(T_p, R_p)$. These p streams will always be transmitted regardless of the power allocation policy that may, as previously explained, allocate no power to certain subchannels. The streams assigned to the latter subchannels are then lost, contributing to a bad overall BER performance. Furthermore, as the SNR increases, these initially disregarded modes may eventually be selected and may monopolize most of the power budget, leading to an inefficient power allocation solution. Both previous remarks highlight the influence of the choice of p on the system performance and power allocation efficiency. Hence, the motivation to include p as a design parameter in order to optimize the system performance.

For a fixed number of streams p and a fixed symbol modulation scheme across these streams, the optimal joint Tx/Rx MMSE solution, given by the filter-pair $(T_p, R_p)$, gives rise the minimum Mean Squared Error $MSE_p$:

$$MSE_p = \operatorname{trace}\left[\underbrace{(I_p - \Sigma_t\Sigma_p\Sigma_r)^2}_{\text{imperfect equalization}} + \underbrace{\sigma_n^2\Sigma_r^2}_{\text{noise contribution}}\right]$$ (formula 18)

which consists of two distinct contributions, namely the imperfect subchannel gain equalization contribution and the noise contribution. Certain embodiments of the systems and methods minimize $MSE_p$ with respect to the number of streams p under a fixed rate constraint. The same symbol modulation scheme is assumed across the spatial substreams for a low-complexity optimal joint Tx/Rx MMSE design. This symbol modulation scheme, however, can be adapted to p to satisfy the fixed reference rate R. Hence, the constellation size corresponding to a given number of spatial streams p is denoted $M_p$. The proposed optimization problem can be drawn:

$$\begin{cases} \operatorname{Min}_p & E\{MSE_p\} \\ \text{subject to: } & p \times \log 2(M_p) = R \end{cases}$$ (formula 19)

The resulting design $(p_{opt}, M_{opt}, T_{opt}, R_{opt})$ is referred to as the spatially optimized Joint Tx/Rx MMSE design. For rectangular QAM constellations (e.g., $E_s = 2(M_p-1)/3$), the constrained minimization problem formulated in formula 19 reduces to:

$$\operatorname{Min}_p\left\{\operatorname{trace}\left[\dfrac{2}{3}(2^{R/p}-1)(I_p - \Sigma_t\Sigma_p\Sigma_r)^2 + \sigma_n^2\Sigma_r^2\right]\right\}$$ (formula 20)

The latter formulation suggests that optimal $p_{opt}$ is the number of spatial streams that enables a reasonable constellation size $M_{opt}$, while achieving the optimal power distribution that balances, on the one hand, the achieved SNR on the used subchannels and, on the other hand, the receive noise enhancement.

Figure 9:
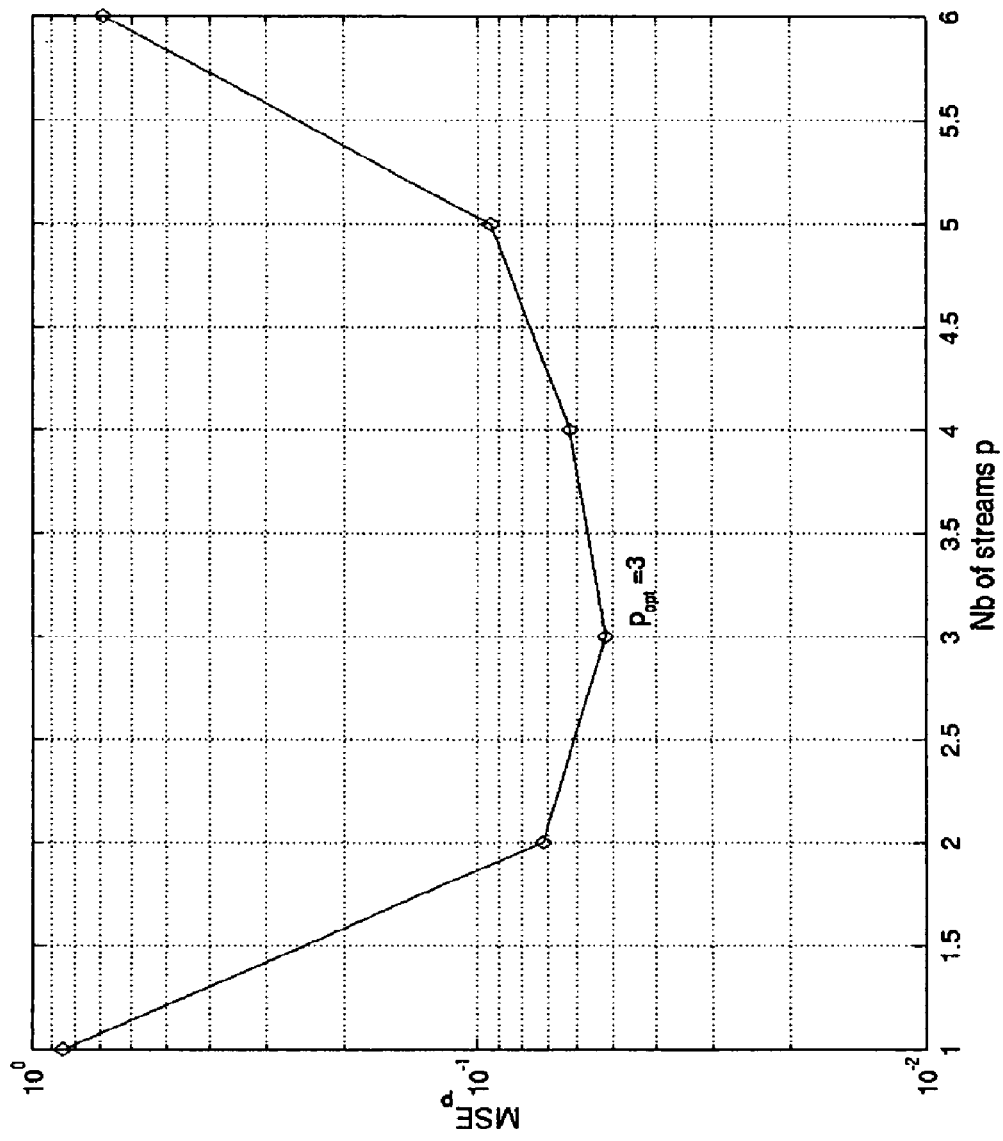
FIG. 9 illustrates the existence (a) and distribution (b) of the optimal number of streams $p_{opt}$ for a (6,6) MIMO system.

To illustrate the existence of $p_{opt}$, the optimization problem of formula 20 is solved for a case-study MIMO set-up where $M_T = M_R = 6$. An average total transmit power $P_T$ is assumed $P_T = 1$, an average receive SNR=20 dB and a reference rate R=12 bits/channel use. Moreover, as for all the included simulations, the MIMO channel is considered to be stationary flat-fading and is modeled as a $M_R \times M_T$ matrix with iid unit-variance zero-mean complex Gaussian entries. Moreover, perfect (error-free) Channel State Information (CSI) is assumed at both transmitter and receiver sides. FIG. 9 shows $p_{opt}$'s existence (a) and distribution (b) when evaluated over a large number of channel realizations.

Figure 10:
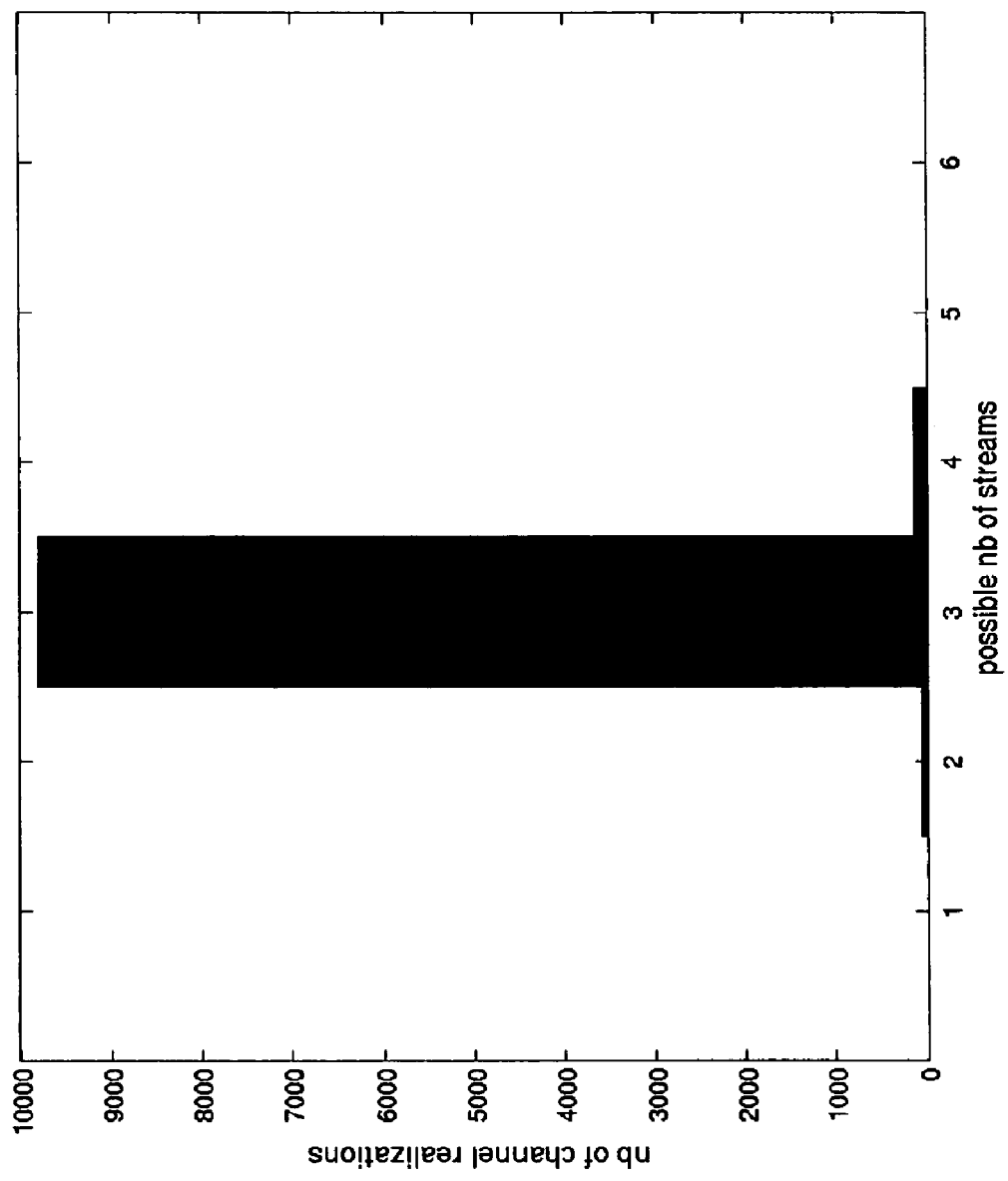
FIG. 10 illustrates $p_{opt}$'s distribution for different reference rates R.
Figure 11:
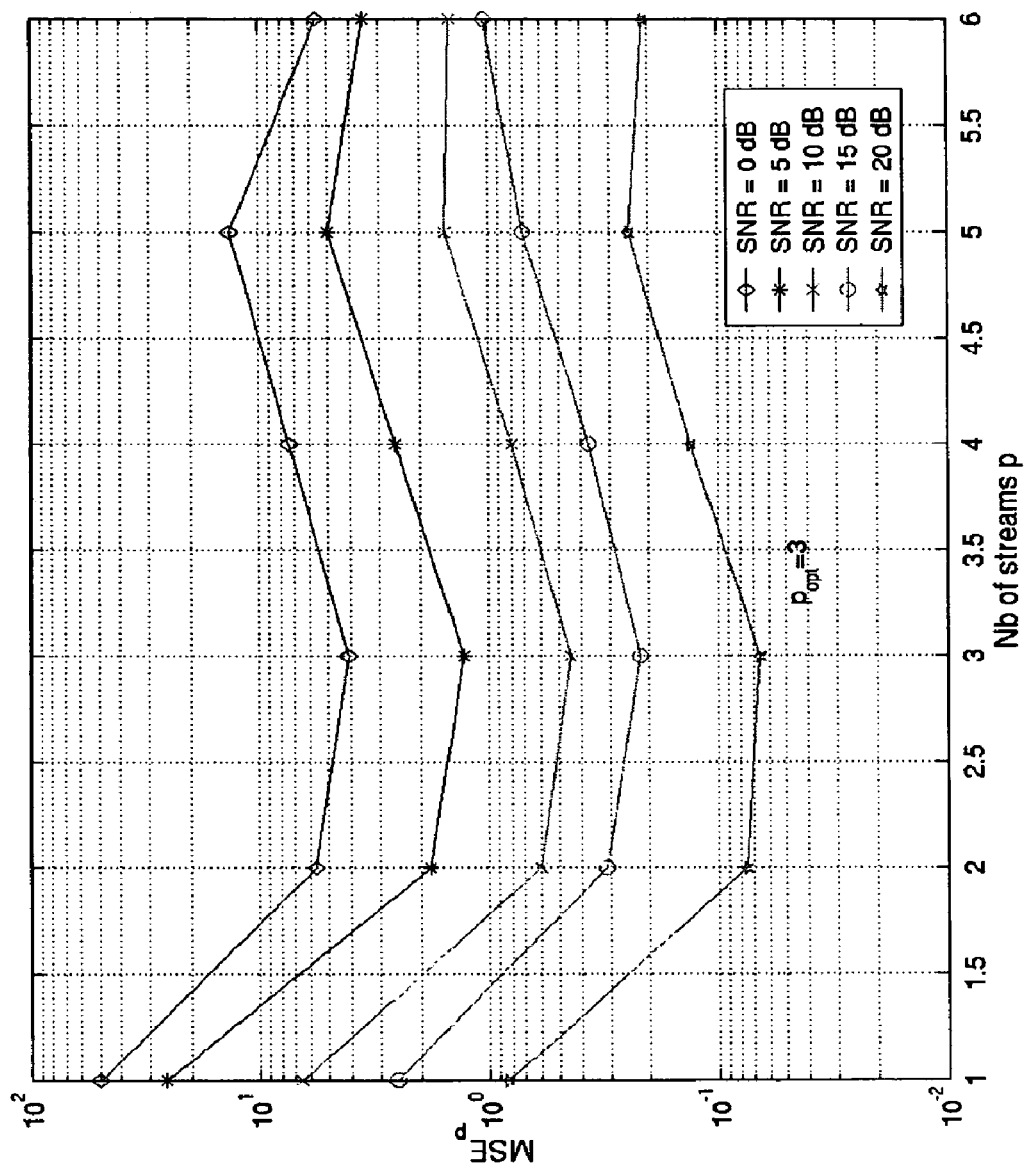
FIG. 11 illustrates the $MSE_p$ versus p for different SNR levels.
Figure 12:
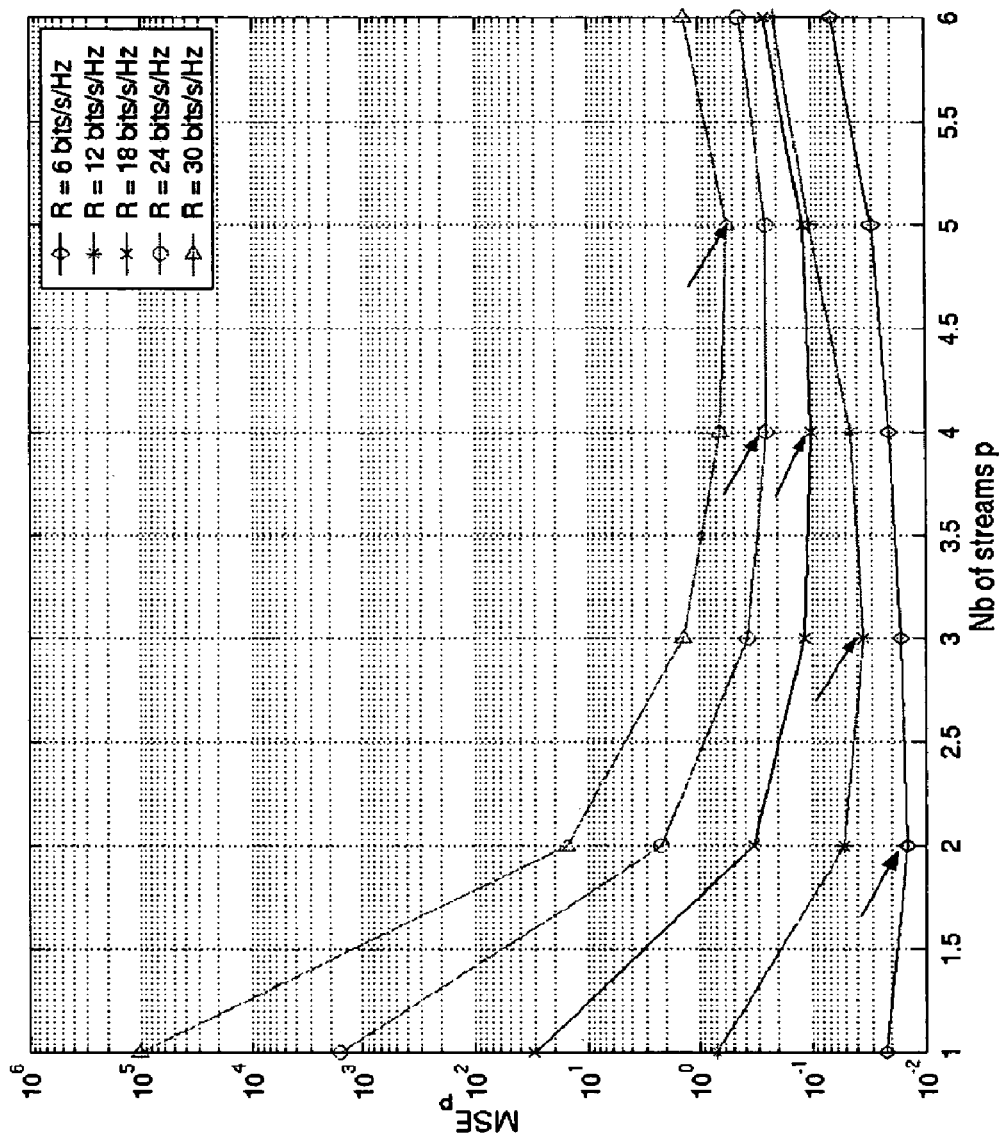
FIG. 12 illustrates a comparison between the exact $MSE_p$ and the simplified one.

The reference rate R certainly determines, for a given ($M_T$, $M_R$) MIMO system, the optimal number of streams $p_{opt}$ as the $MSE_p$ explicitly depends on R as shown in formula 20. This is illustrated in FIG. 10 where $p_{opt}$ clearly increases as the reference rate R increases. Indeed, to convey a much higher rate R at reasonable constellation sizes, a larger number of parallel streams is desirable.

The dependence of $p_{opt}$ on the SNR is investigated. For a sample channel of the previous MIMO case study, FIG. 10 illustrates the system's $MSE_p$ for different SNR values. As expected, the $MSE_p$ globally diminishes as the SNR increases. The optimal number of streams $p_{opt}$, however, stays the same for the considered channel. This result is predictable since the noise power $\sigma_n^2$ is assumed to be the same on every receive antenna. In these circumstances, the power allocation matrix $\Sigma_t$ basically acts on the subchannel gains $(\sigma_p)$ $(1 \leq p \leq \min(MT,MR))$ in $\Sigma_p$ trying to balance them while $\Sigma_r$ equalizes these channel gains. Consequently, to convey a reference rate R through a given ($M_T$, $M_R$) MIMO channel using a transmit power $P_T$, there exists a unique $p_{opt}$ which is independent of the SNR. This allows the assumption of the asymptotic high SNR situation when computing $p_{opt}$. In a high SNR situation, the power budget is sufficient for $\Sigma_t$ to select and allocate power to all p necessary modes as shown in formula 17. From this, one can find the expression of the Lagrange multiplier $\lambda$ and re-write formula 15 as follows $$\begin{cases} \Sigma_t^2 = \dfrac{\sigma_n}{\sqrt{E_s\lambda}}\Sigma_p^{-1} - \dfrac{\sigma_n^2}{E_s}\Sigma_p^{-2} \\ \text{where: } \lambda = \left(\dfrac{\sqrt{E_s}\,\sigma_n \operatorname{trace}(\Sigma_p^{-1})}{P_T + \sigma_n^2\operatorname{trace}(\Sigma_p^{-2})}\right)^2 \end{cases}$$ (formula 21)

Using the previous expressions of $\Sigma_t$ and $\lambda$ and that of $\Sigma_r$ given in formula 16, the expression of $MSE_p$ reduces to:

$$MSE_p = \frac{E_s \sigma_n^2 \text{trace}(\Sigma_p^{-1})^2}{P_T + \sigma_n^2 \text{trace}(\Sigma_p^2)} \quad \text{(formula 22)}$$

For high SNRs, the second term in the denominator $\sigma_n^2 \cdot \text{trace}(\Sigma_p^{-2})$ is negligible compared to $P_T$. Furthermore, the noise level can be removed. Hence, a simplified error expression $Err_p$ can be drawn $$Err_p = \frac{2}{3}(2^{R/p} - 1) \cdot \text{trace}\left(\sum\nolimits_p^{-1}\right)^2 \quad \text{(formula 23)}$$

The complex $MSE_p$ expression of formula 20, which depends on a large amount of parameters and which is composed of highly inter-dependent quantities, can be reduced to a simplified expression $Err_p$ that preserves the same monotony and thus the same $p_{opt}$ as corroborated in FIG. 8. The simplified $Err_p$, expressed in formula 23, is a product of only two terms, each depending on a single system parameter, namely the channel singular matrix $\Sigma_p$ and the reference rate R. The proposed simplified $Err_p$ eases $p_{opt}$'s computation and more advantageously does not require noise power estimation.

Figure 13:
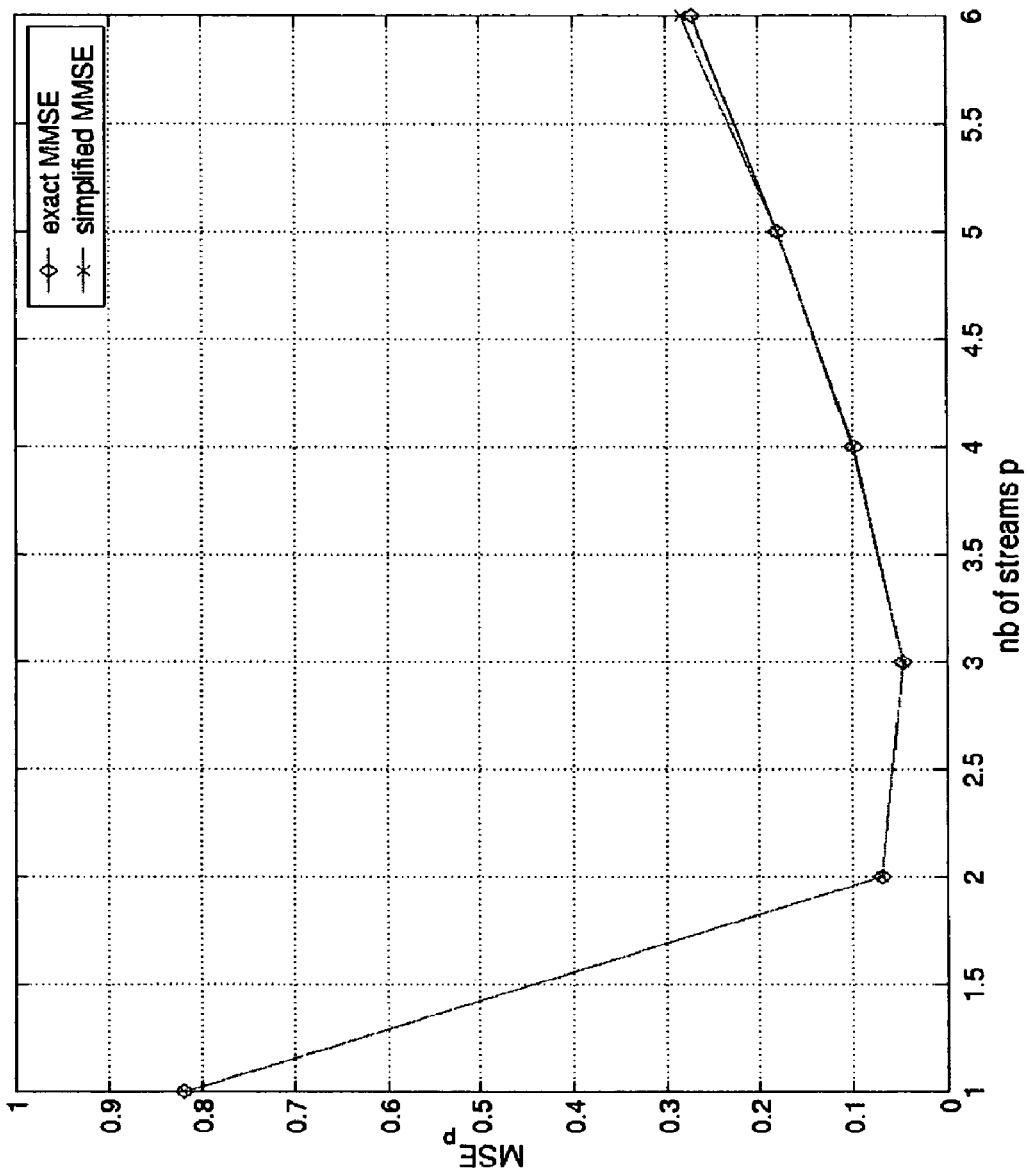
FIG. 13 illustrates a comparison between the BER performance of the spatially optimized and conventional Tx/Rx MMSE.

Previously, for channel realization, the existence was exhibited of an optimal number of spatial streams $p_{opt}$ which minimizes the system's $MMSE_p$. Consequently, a spatially optimized joint Tx/Rx MMSE design is described that adaptively determines and uses $p_{opt}$ and its corresponding constellation size $M_{opt}$. In this section, it is investigated how the proposed design bit error rate (BER) performance compares to those of the conventional joint Tx/Rx MMSE and the optimal spatial adaptive loading, where the number of spatial streams p is arbitrarily fixed. FIG. 13 depicts the BER performance of the conventional joint Tx/Rx MMSE design for different fixed number of streams and that of our spatially optimized joint Tx/Rx MMSE for the case study (6,6) MIMO system. The optimized joint Tx/Rx MMSE offers a 10.4 dB SNR gain over full spatial multiplexing, where the maximum number of spatial streams is used $p=\min(M_T,M_R)$, at BER=$10^{-2}$ and reference rate R=12 bits/channel use. Such a significant performance improvement can be attributed to one or more of several reasons. First, the optimized joint Tx/Rx MMSE design is mostly using $P_{opt}=3$, as can be seen in FIG. 9, which is lower than p=6 used in the full spatial multiplexing case. Reducing the number of used spatial streams allows a better exploitation of the system's spatial diversity, which explains in part the observed higher curve slope. Second, reducing the number of used streams translates into a higher gain equivalent channel. The optimized joint Tx/Rx MMSE design uses the best $p_{opt}$ subchannels and discards the weak ones. In addition, the optimized constellation size $M_{opt}$ guarantees an optimal BER performance. The latter point illustrates that the joint Tx/Rx MMSE design outperforms the conventional joint Tx/Rx MMSE design with fixed p=2 streams, whereas the latter case better illustrates the former points.

Figure 14:
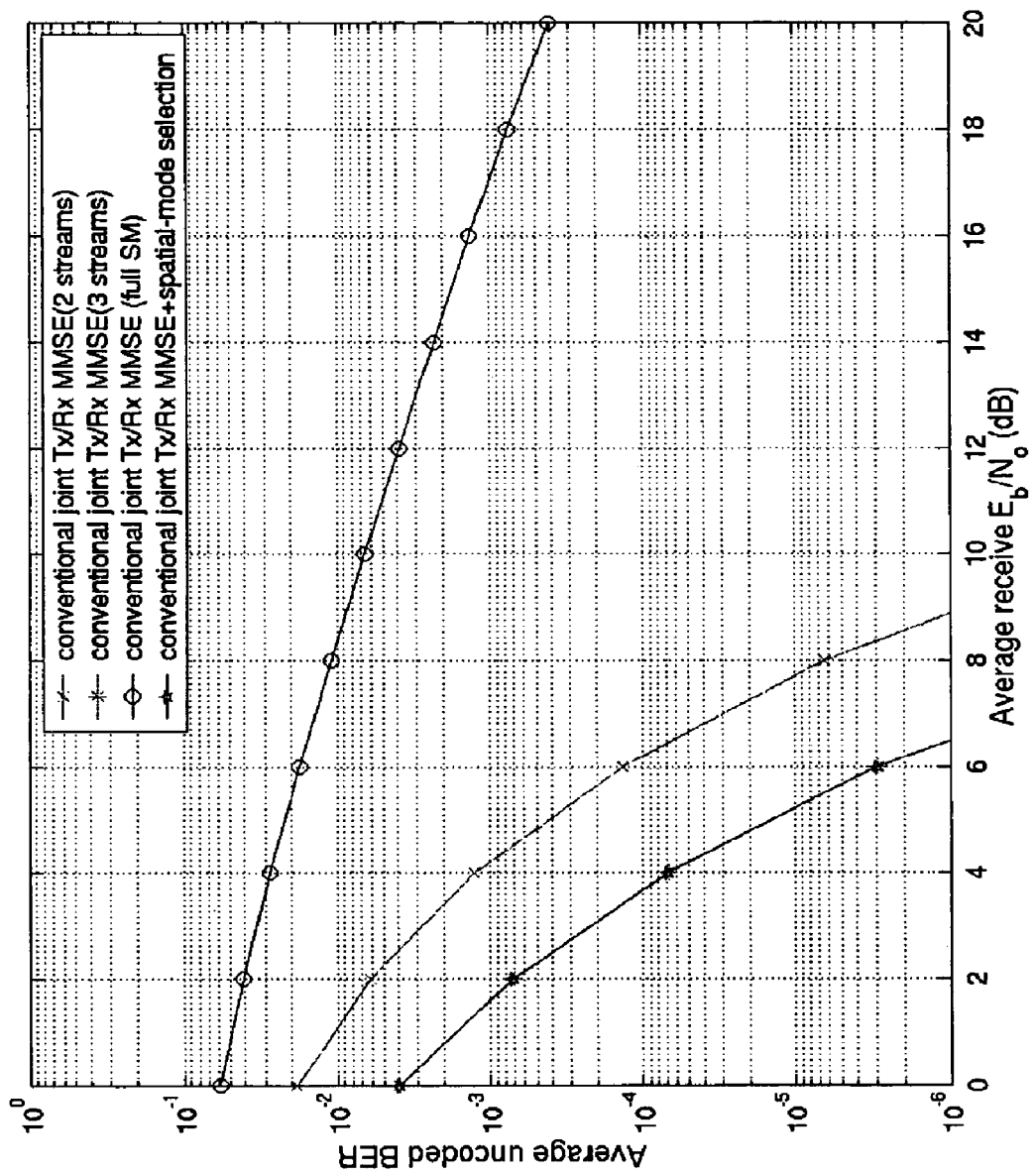
FIG. 14 illustrates a comparison of the spatially optimized joint Tx/Rx MMSE to the optimal joint Tx/Rx MMSE and spatial adaptive loading for different reference rates R.

FIG. 14 illustrates the comparison between the BER performance of the spatially optimized joint Tx/Rx MMSE and that of the optimal joint Tx/Rx MMSE design for the previously considered MIMO set-up and different reference rates, namely R={12,18,24} bits per channel use. The optimal joint Tx/Rx MMSE refers to the design that adaptively (for each channel realization) determines and uses the number of spatial streams p and the constellation size $M_p$ that minimizes the system BER under average total transmit power and rate constraints. FIG. 14 also illustrates a lower BER bound corresponding to the optimal performance of spatial adaptive loading, combined with MMSE detection. The loading algorithm used herein is the Fischer algorithm, although other analogous algorithms could alternatively be used.

The spatially optimized design clearly exhibits the same average performance as the optimal MMSE. This suggests that the optimization criterion, namely global MSE minimization (see, e.g., formula 19), equivalently minimizes the system's BER. Furthermore, the optimized joint Tx/Rx MMSE design exhibits less than 2 dB SNR loss at BER=$10^{-3}$ compared to the spatial adaptive loading. This performance difference can be attributed at least in part to the adaptive loading that adapts not only the used number of streams, but also the constellation sizes across these streams, to achieve the lowest possible BER performance. The optimized joint Tx/Rx MMSE design assumes fixed constellations across the spatial streams to reduce the adaptation requirements and complexity. In addition, the optimized joint Tx/Rx MMSE appears to achieve the same diversity order as spatial adaptive loading, as their BER curves have substantially the same slope.

In some embodiments, wherein the number of spatial streams used by the spatial multiplexing joint Tx/Rx MMSE design are optimized, the spatial diversity offered by MIMO systems are better exploited, and hence, significantly improve the system's BER performance. Thus, the systems and methods include a new spatially optimized joint Tx/Rx MMSE design. For a (6,6) MIMO set-up, the latter proposed design exhibits a 10.4 dB gain over the full spatial multiplexing conventional design for a BER=$10^{-2}$, a unit average total transmit power, a reference rate R=12 bits per channel use and iid channel. Furthermore, the optimality of the spatially optimized joint Tx/Rx MMSE is shown for fixed modulation across streams. Including the number of streams as a design parameter for spatial multiplexing MIMO systems can provide significant performance enhancement.

An alternative spatial-mode selection criterion targets the minimization of the system BER, which is applicable for both uncoded and coded systems. This criterion examines the BERs on the individual spatial modes in order to identify the optimal number of spatial streams to be used for a minimum system average BER.

Both described conventional and even-MSE joint Tx/Rx MMSE designs have been derived for a given number of spatial streams p which is arbitrarily chosen and fixed. These p streams will always be transmitted regardless of the power allocation policy that may, as previously highlighted, allocate no power to certain weak spatial subchannels. The data streams assigned to the latter subchannels are then lost, leading to a poor overall bit error rate (BER) performance. Furthermore, as the SNR increases, these initially disregarded modes will eventually be given power and will monopolize most of the available transmit power, leading to an inefficient power allocation strategy that detrimentally impacts the strong modes. Finally, it has been shown that the spatial subchannel gains exhibit decreasing diversity orders. This means that the weakest used subchannel sets the spatial diversity order exploited by joint Tx/Rx MMSE design. The previous remarks highlight the influence of the choice of p on the transmit power allocation efficiency, the exhibited spatial diversity order and thus on the joint Tx/Rx MMSE designs' bit error rate performance. Hence, it alternatively is proposed to include p as a design parameter to be optimized according to the available channel knowledge for an improved system BER performance, which is subsequently referred to as spatial-mode selection. This approach is applicable for both uncoded and coded systems.

It is advantageous to achieve a spatial-mode selection criterion that minimizes the system's BER. In order to identify such criterion, we can subsequently derive the expression of the conventional joint Tx/Rx MMSE design's average BER and analyze the respective contributions of the individual used spatial modes. For the used Gray-encoded square QAM constellations of size $M_p$ and minimum Euclidean distance $d_{min}=2$, the conventional joint Tx/Rx MMSE design's average BER across p spatial modes, denoted $BER_{conv}$, is approximated by $$BER_{conv} = \frac{2}{\log_2(M_p)} \cdot \left(1 - \frac{1}{\sqrt{M_p}}\right) \cdot \frac{1}{p}\sum_{k=1}^{p} \mathrm{erfc}\left(\sqrt{\frac{\sigma_k^2 \sigma_{Tk}^2}{\sigma_n^2}}\right) \quad \text{(formula 24)}$$

where $\sigma_k$ denotes the $k^{th}$ diagonal element of $\Sigma_p$, which represents the $k^{th}$ spatial mode gain. Similarly, $\sigma_{Tk}$ is the $k^{th}$ diagonal element of $\Sigma_T$, whose square designates the transmit power allocated to the $k^{th}$ spatial mode. Hence, the argument $$\frac{\sigma_k^2 \sigma_{Tk}^2}{\sigma_n^2}$$

is easily identified as the average Signal-to-Noise Ratio (SNR) normalized to the symbol energy $E_s$, on the $k^{th}$ spatial mode. For a given constellation $M_p$, these average SNRs clearly determine the BER on their corresponding spatial modes. The conventional design's average BER performance, however, depends on the SNRs on all p spatial modes as shown in formula (24). Consequently, the (p×p) diagonal SNR matrix $SNR_p$ better characterizes the conventional design's BER, whose diagonal consists of the average SNRs on the p spatial modes:

$$SNR_p = \frac{\Sigma_p^2 \cdot \Sigma_T^2}{\sigma_n^2} \quad \text{(formula 25)}$$

Replacing the transmit power allocation matrix $\Sigma_T$ by its expression formulated in formula (21), the previous $SNR_p$ expression can be developed into:

$$SNR_p = \left[\frac{1}{\sigma_n \sqrt{\lambda E_s}} \Sigma_p - \frac{1}{E_s} I_p\right]^+ \quad \text{(formula 26)}$$

The latter expression illustrates that the conventional joint Tx/Rx MMSE design induces uneven SNRs on the different p spatial streams. More importantly, formula (26) shows that the weaker the spatial mode is, the lower its experienced SNR. Since, the conventional joint Tx/Rx MMSE BER, BER, $BER_{conv}$, of formula (24) can be rewritten as follows:

$$BER_{conv} = \quad \text{(formula 27)}$$

$$\frac{2}{\log_2(M_p)} \cdot \left(1 - \frac{1}{\sqrt{M_p}}\right) \cdot \frac{1}{p}\sum_{k=1}^{p} \mathrm{erfc}\left(\sqrt{SNR_p(k,k)}\right)$$

The previous SNR analysis further indicates that the p spatial modes exhibit uneven BER contributions and that that of the weakest $p^{th}$ mode, corresponding to the lowest SNR $SNR_p(p, p)$, dominates $BER_{conv}$. Consequently, in order to minimize $BER_{conv}$, the optimal number of streams to be used, $p_{opt}$, may be the one that maximizes the SNR on the weakest used mode under a fixed rate R constraint. The latter proposed spatial-mode selection criterion can be expressed:

$$\begin{cases} \mathrm{Max}_p & SNR_p(p,p) \\ \text{subject to:} & p \times \log_2(M_p) = R \end{cases} \quad \text{(formula 28)}$$

The rate constraint shows that, although the same symbol constellation may be used across spatial streams, the selection/adaptation of the optimal number of streams $p_{opt}$, includes the joint selection/adaptation of the used constellation size $M_{opt}$. Using formula (26) for the considered square QAM constellations (i.e $E_s=2(M_p-1)/3$), the spatial-mode selection criterion stated in formula (24) can be further refined into:

$$BER_{conv} = \quad \text{(formula 27)}$$

$$\frac{2}{\log_2(M_p)} \cdot \left(1 - \frac{1}{\sqrt{M_p}}\right) \cdot \frac{1}{p}\sum_{k=1}^{p} \mathrm{erfc}\left(\sqrt{SNR_p(k,k)}\right)$$

The previous SNR analysis further indicates that the p spatial modes exhibit uneven BER contributions and that that of the weakest $p^{th}$ mode, corresponding to the lowest SNR $SNR_p(p, p)$, dominates $BER_{conv}$. Consequently, in order to minimize $BER_{conv}$, the optimal number of streams to be used, $p_{opt}$, may be the one that maximizes the SNR on the weakest used mode under a fixed rate R constraint. The latter proposed spatial-mode selection criterion can be expressed:

$$\begin{cases} \mathrm{Max}_p & SNR_p(p,p) \\ \text{subject to:} & p \times \log_2(M_p) = R \end{cases} \quad \text{(formula 28)}$$

The rate constraint shows that, though the same symbol constellation is used across spatial streams, the selection/adaptation of the optimal number of streams $p_{opt}$ includes the joint selection/adaptation of the used constellation size $M_{opt}$. Using formula (26) for the considered square QAM constellations (i.e $E_s=2(M_p-1)/3$), the spatial-mode selection criterion stated in formula (28) can be further refined into:

$$p_{opt} = \mathrm{argMax}_p \left[\frac{1}{\sigma_n\sqrt{\frac{2}{3}(2^{R/p}-1)\lambda}}\sigma_p - \frac{1}{\frac{2}{3}(2^{R/p}-1)}\right]^+ \quad \text{(formula 29)}$$

The latter spatial-mode selection problem has to be solved for the current channel realization to identify the optimal pair $\{p_{opt}, M_{opt}\}$ that minimizes the system's average BER, $BER_{conv}$.

A spatial-mode selection is derived based on the conventional joint Tx/Rx MMSE design because this design represents the core transmission structure on which the even-MSE design is based. An exemplary strategy is to first use a spatial-mode selection to optimize the core transmission structure $\{\Sigma_T, \Sigma_{p_{opt}}, \Sigma_R\}$, the even-MSE then additionally applies the unitary matrix Z, which is now a $p_{opt}$-tap IFFT, to further balance the MSEs and the SNRs across the used $p_{opt}$ spatial streams.

A key element in the method described above is the block diagonalization concept, which is to be realized by carefully determining the matrices F and G. Indeed, the pre-filtering at the base station allows the pre-compensation of the channel phase (and amplitude) in such a way that simultaneous users receive their own signal free of MUI. Additionally, this technique includes quasi-perfect downlink channel knowledge, which can be acquired during the uplink or during the downlink and fed back by signaling. From the point of view of minimizing the signaling overhead and resistance to channel time-variations, the former approach is preferred. One starts from the assumption that the channel is reciprocal, so that the downlink channel matrix is simply the transpose of the uplink channel matrix.

However, the 'channel' is actually made up of several parts: the propagation channel (the medium between the antennas), the antennas and the transceiver RF, IF and baseband circuits at both sides of the link. The transceiver circuits are usually not reciprocal and this can jeopardize the system performance.

A system with a multi-antenna base station and a single antenna terminal is described. Note, however, that in other embodiments, the system is extended to a full MIMO scenario (multi-antenna base station and a multi-antenna terminal).

In the uplink, U user mobile terminals transmit simultaneously to a BS using A antennas. Each user u employs conventional OFDM modulation with N sub-carriers and cyclic prefix of length P. Each user signal is filtered, up-converted to RF, and transmitted over the channel to the BS. Each BS antenna collects the sum of the U convolutions and add white Gaussian noise (AWGN) noise. In each antenna branch, the BS then down-converts and filters the signals, removes the cyclic prefix and performs direct Fourier transform, which yields the frequency domain received signals $y_a[n]$. If the cyclic prefix is sufficiently large and with proper carrier and symbol synchronization, the BS observes the linear channel convolutions as cyclic and the following linear frequency domain model results on each sub-carrier n:

$$\underbrace{\begin{bmatrix} y_1[n] \\ \vdots \\ y_A[n] \end{bmatrix}}_{y^{UL}[n]} = \underbrace{\begin{bmatrix} h_{11}[n] & \dots & h_{1U}[n] \\ \vdots & & \vdots \\ h_{A1}[n] & \dots & h_{AU}[n] \end{bmatrix}}_{H^{UL}[n]} \cdot \underbrace{\begin{bmatrix} x_1[n] \\ \vdots \\ x_U[n] \end{bmatrix}}_{x^{UL}[n]} + \underbrace{\begin{bmatrix} n_1[n] \\ \vdots \\ n_A[n] \end{bmatrix}}_{n[n]} \quad \text{(formula 30)}$$

where $x^{UL}[n]$ is the column vector of the U frequency domain symbols at sub-carrier n transmitted by the terminals, $y^{UL}[n]$ is the column vector of the A signals received by the BS antenna branches, and $H^{UL}$ is the composite uplink channel: In the sequel, the explicit dependency on [n] is dropped for clarity.

Including the terminal transmitters and the BS receiver, $H^{UL}[n]$ can be expressed as:

$$H^{UL} = D_{RX,BS} \cdot H \cdot D_{TX,MT} \quad \text{(formula 31)}$$

where $D_{RX,BS}$ and $D_{TX,MT}$ are complex diagonal matrices containing, respectively, the BS receiver and mobile terminal transmitters frequency responses (as used herein, the letter D signifies that the matrices are diagonal). The matrix H includes the propagation channel itself, which is reciprocal. In order to recover the transmitted symbols, the BS uses a channel estimation algorithm that provides the estimate $\hat{H}^{UL}$ affected by $D_{RX,BS}$ and $D_{TX,MT}$.

For embodiments of the downlink, SDMA separation is achieved by applying a per-carrier pre-filter that pre-equalizes the channel. This pre-filtering is included in the $F^{DL}$ matrix of the frequency domain linear model:

$$y^{DL} = H^{DL} \cdot F^{DL} \cdot D_p \cdot x^{DL} + n \quad \text{(formula 32)}$$

where $x^{DL}$ is the column vector of the U symbols transmitted by the BS, $y^{DL}$ is the column vector of the U signals received by the terminals, $D_P$ is an optional power scaling diagonal matrix and $H^{DL}$ is the composite downlink channel. $H^{DL}$ is also affected by the BS and terminals hardware:

$$H^{DL} = D_{RX,MT} \cdot H^T \cdot D_{TX,BS} \quad \text{(formula 33)}$$

where $D_{TX,BS}$ and $D_{RX,MT}$ are complex diagonal matrices containing, respectively, the BS transmitter and mobile terminal receivers frequency responses and $H^T$ is the transpose of H, the uplink propagation channel; clearly, one can use $H^T$ for the downlink if the downlink transmission occurs without significant delay after the uplink channel estimation, compared to the coherence time of the channel. For the following description, the channel is assumed to be static or slowly varying, which is a valid assumption for indoor WLAN channels.

For the channel inversion strategy, the pre-filtering matrix is the inverse (or pseudo-inverse if U<A) of the transpose of the uplink channel matrix so that, preferably, the product of the pre-filtering matrix and the downlink channel matrix is the identity matrix. Assuming substantially perfect channel estimation, one can substitute $H_{UL}$ to $\hat{H}_{UL}$ and express $F^{DL}$ as:

$$F_{DL} = (\hat{H}^{UL})^{-T} \cong (D_{RX,BS} \cdot H \cdot D_{TX,MT})^{-T} \quad \text{(formula 34)}$$

Finally, replacing $F^{DL}$ and $H^{DL}$ in the downlink linear system model (see formula 32), the received downlink signal per sub-carrier becomes:

$$y^{DL} = \underbrace{D_{RX,MT} H^T D_{TX,BS}}_{H^{DL}} \cdot \underbrace{D_{RX,BS}^{-1} H^T D_{TX,MT}^{-1}}_{F^{DL} = (H^{UL})^{-T}} \cdot \underbrace{D_p}_{Power} \cdot x^{DL} + n \quad \text{(formula 35)}$$

Note that the introduction of $D_p$ allows this model to support other downlink strategies such as channel orthogonalization and, more generally, power control in the downlink.

The linear model presented above lends itself to several useful interpretations and highlights the origin of the MUI:

The effect of channel pre-filtering may be altered by the two diagonal matrices appearing between $H^T$ and $H^{-T}$. This is due to transceiver effects at the BS. What causes MUI is the BS non-reciprocity: $D_{TX,BS} \cdot (D_{RX,BS})^{-1}$ is not equal to the identity matrix multiplied by a scalar, although this product is diagonal. However, the identity matrix, multiplied by an arbitrary complex scalar, could be "inserted" between $H^T$ and $H^{-T}$ without causing MUI.

The terminal front-end effects ($D_{TX,MT}$ and $D_{RX,MT}$) generally do not contribute to MUI. However, even with perfect BS reciprocity, $D_{TX,MT}$ and $D_{RX,MT}$ will result in scaling and rotation of the constellations received at the UT, which imposes the use of an equalizer at the UT. The power scaling matrix $D^P$ also contributes to amplitude modifications that must be equalized at the terminal. Note that the terminal equalizer is a conventional time-only equalizer (as opposed to space-time equalizers). This equalizer is also useful to compensate the unknown phase of the base station RF oscillator at TX time.

The propagation matrix H in this model also includes the parts of the BS or terminals that are common to uplink and downlink, hence reciprocal. This is the case for the antennas and for any common component inserted between the antenna and the Tx/Rx switch (or circulator).

In an embodiment of the system, the MUI introduced by the BS front-end can be avoided by a calibration method that allows measuring the $D_{TX,BS} \cdot (D_{RX,BS})^{-1}$ product at the BS so that the mismatches can be pre-compensated digitally at the transmitter.

Figure 15:
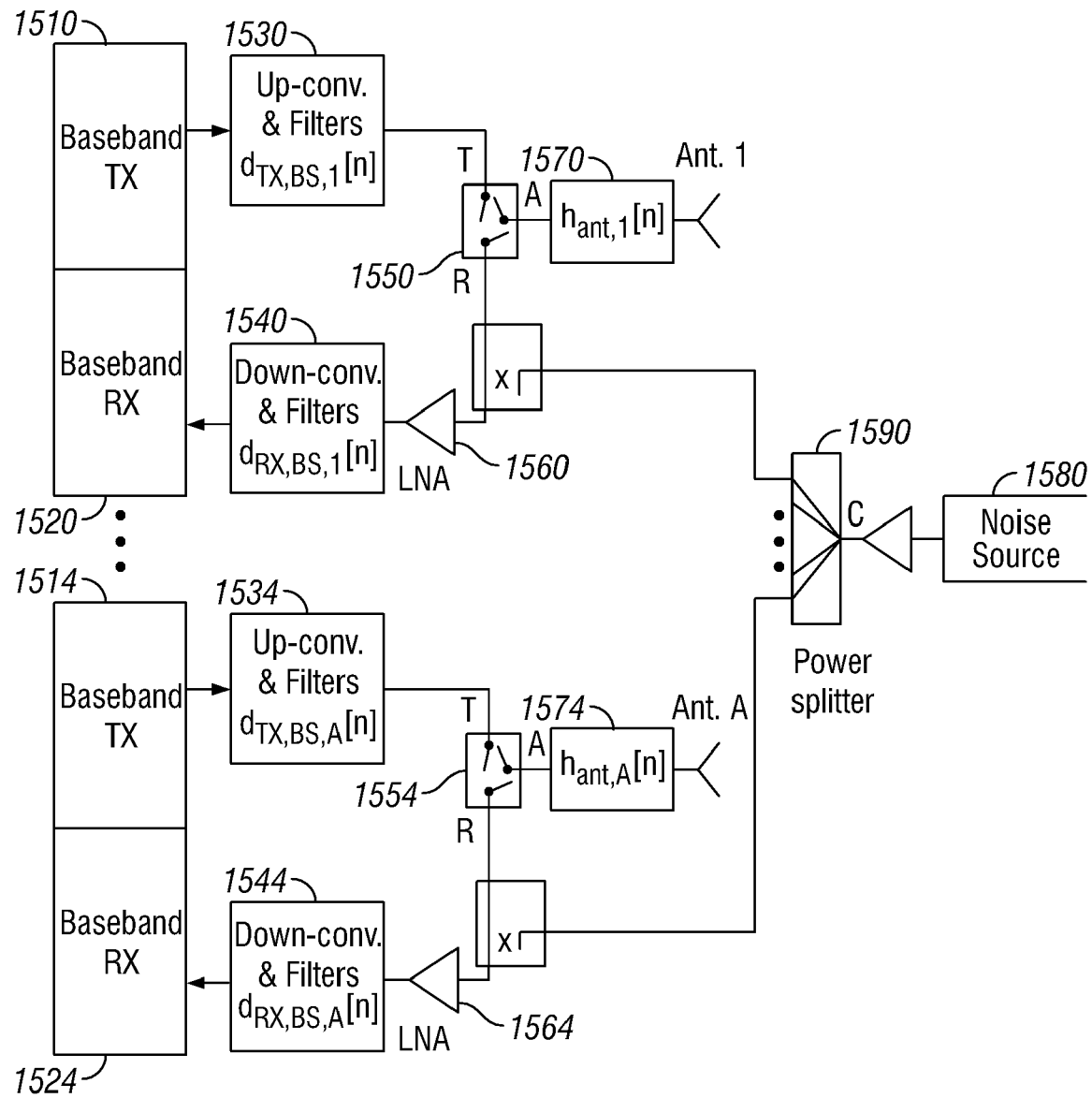
FIG. 15 illustrates a block diagram of a multi-antenna base station with calibration loop.

The block diagram of the SDMA BS Transceiver with the calibration hardware is illustrated in FIG. 15. In this block diagram, the complex frequency response of each transmitter 1510 1514 is represented by a single transfer function $d_{TX,BS,a}[n]$ 1530 1534, which is, for the transmitter 1514 of antenna branch a, the concatenation (product) of the frequency response of the baseband section with the low pass equivalent of the IF/RF section frequency response. These terms are the diagonal elements of the $D_{TX,BS}[n]$ matrix. A similar definition holds for $d_{RX,BS,a}[n]$ 1540 1544.

Before calibration, the carrier frequency and the transceiver parameters that have an effect on the amplitude or phase response of the transmitter 1510 1514 and/or receiver 1520 1524 are set. This includes attenuator, power level, pre-selection filters, carrier frequency, gain of variable gain amplifiers, etc. Note that this may require several calibrations for a given carrier frequency. Once the parameters are set, the frequency responses are assumed static. The calibration is achieved in two steps: TX-RX calibration and RX-only calibration. Note that all described calibration operations are complex.

In one step, the transmit-receive calibration is performed (measurement of $D_{TX,BS} \cdot D_{RX,BS}$). A transmit/receive/calibration switch 1550 1554 is put in calibration mode: T and R are connected, so as to realize a loopback connection where the transmitter signal is routed all the way from baseband to RF and back from RF to baseband in the receiver 1520 1524. The RF calibration noise source 1580 is turned off. In each antenna branch, a suitable known signal $s_a$ (an OFDM symbol with low peak-to-average power ratio) is generated by the digital modem so as to measure the frequency response of the cascaded transmitter and receiver. With the usual assumptions of perfect synchronization and cyclic prefix length, the frequency domain received signal is:

$$r_1^k = D_{TX} \cdot D_{RX} s + n^k \quad \text{(formula 36)}$$

where $s = [s_1 \ldots s_A]^T$ and $n^k$ is a noise vector, the main contribution of which comes from the LNA noise FIG. 1560 1564. K measurements are taken, which is reflected by the index k. The $D_{TX,BS} \cdot D_{RX,BS}$ product can be estimated by averaging the K values of $r_1^k$:

$$a = \frac{1}{K} \sum_{k=1}^{K} r_k^1 \cong \mathrm{diag}(D_{TX,BS} \cdot D_{DX,BS}) \quad \text{(formula 37)}$$

In an additional step, there is only receive calibration (measurement of $D_{RX,BS}$). The transmit/receive/calibration switch 1550 1554 is connected so as to isolate the receiver 1520 1524 from both the transmitter 1510 1514 and the antenna 1570 1574. The calibration noise source 1580 is turned on. Its excess noise ratio (ENR) is typically sufficient to exceed the thermal noise generated by the LNAs 1560 1564 by 20 dB or more. The signal is sampled and measured at baseband in the receiver 1520 1524 of all antenna branches substantially simultaneously, which is advantageous for perfect phase calibration. The received frequency domain signal is:

$$r_2^k = D_{RX,BS} \cdot n_{ref}^k + n^k \quad \text{(formula 38)}$$

where $n_{ref}$ is the reference noise injected at RF, substantially identical at the input of all antenna branches. $D_{RX,BS}$ cannot be extracted directly, even by averaging, since $n_{ref}$ appears as a multiplicative term. However, since an identical error coefficient in all antenna branches is allowed, $n_{ref}$ can be eliminated by using the output of one of the antenna branches as reference and dividing the outputs of all branches by this reference value. Without loss of generality, we will take the signal in the first antenna branch $r_{2,1}^k$ as reference. This division operation yields:

$$b^k = \frac{1}{r_{2,1}^k} \cdot r_2^k = \frac{1}{d_{RX,BS,1} \cdot n_{ref}^k + n_1^k} (D_{RX,BS} \cdot n_{ref}^k + n^k) \quad \text{(formula 39)}$$

If the reference noise $n_{ref}$ is much larger than the receiver noise n, this reduces after averaging K measurements to:

$$c = \frac{1}{K} \sum_{k=1}^{K} b^k \cong \frac{1}{d_{RX,BS,1}} D_{RX,BS} \quad \text{(formula 40)}$$

which is a vector containing the frequency responses of the receiver branches with a complex error coefficient, common to all antenna branches.

In the division process, the $r_{2,1}^k$ term is normally dominated by the reference noise multiplied by the frequency response $d_{RX,BS,1}$ of the receiver chain of the first antenna branch. The magnitude of this frequency response is by design non-zero since the filters have low ripple and are calibrated in their passband. However, the amplitude of this term can be shown to be Rayleigh distributed and, hence, can in some cases be very low. It is therefore advantageous to substantially eliminate these values before the averaging process since the non-correlated LNA noise 1560 1564 is dominant in these cases. A suitable criteria is to remove from the averaging process those realizations where the absolute value of $r_{2,1}^k$ is smaller than 0.15 . . . 0.25 times its mean value. Finally, the desired value is given by:

$$a./(c)^2 \cong d_{RX,BS,1}^2 \cdot \mathrm{diag}(D_{TX,BS} \cdot D_{RX,BS}^{-1}) \quad \text{(formula 41)}$$

where ./ stands for element-wise division. These are the values that, in some embodiments, are pre-compensated digitally before transmission. The unknown $d_{RX,BS,1}^2$ factor is substantially identical in all branches, but this does not introduce MUI.

A variance analysis of the estimation error of the $D_{TX,BS} \cdot (D_{RX,BS})^{-1}$ product shows that with very mild parameter setting (20 dB ENR, 64 point FFT and 32 averages), one reaches an amplitude variance of 0.0008 and a phase variance of 0.0009. At 1 sigma, this corresponds to 0.24 dB amplitude and 1.72° phase differences. This can easily be improved with higher ENR ratio and/or more averaging. These values were obtained for errors before calibration as large as ±3 dB for the amplitude and ±π for the phase.

FIG. 16 shows the BER degradations with and without calibration. '5 degr. & 0.7 dB reciprocity mismatch' indicates that both the phase and amplitude mismatches described above were introduced (a difficult matching requirement for complete TX and RX chain). Note that the 4-user case at a BER of $10^{-3}$ is not targeted because the required SNR is higher than 25 dB, even with ideal calibration.

Although this calibration method relieves the TX and RX chain from any matching requirement, it does introduce some matching requirement on the calibration hardware. For example:

The splitter (1590 in FIG. 15) outputs are matched between branches

The directional couplers are matched

The TX/RX/calibration switch (1550 1554 in FIG. 15) are matched between branches Mismatches in the calibration hardware can be included in the model by including 4 additional diagonal matrices (T, R, A and C are indicated in FIG. 15):

$D_{TA}$ (TX-to-Antenna switch transfer function)
$D_{TR}$ (TX-to-RX switch transfer function)
$D_{AR}$ (Antenna-to-RX switch transfer function)
$D_{CR}$ (Calibr. Noise-to-RX transfer function)

Then, the downlink model becomes:

$$y^{DL} = D_{RX,MT} H^T D_{TA} D_{CR} D_{TR}^{-1} D_{AR}^{-1} H^{-T} D_{TM,MT}^{-1} D_P x^{DL} + n \quad \text{(formula 42)}$$

The mismatches introduced by the calibration hardware is advantageously minimized. However, this matching requirement is limited to a few components and is easier to achieve than the transmitter and receiver matching required when no calibration is included (matching of overall transfer functions including filters, mixers, LO phases, amplifiers, etc. . . . ).

Figure 17:
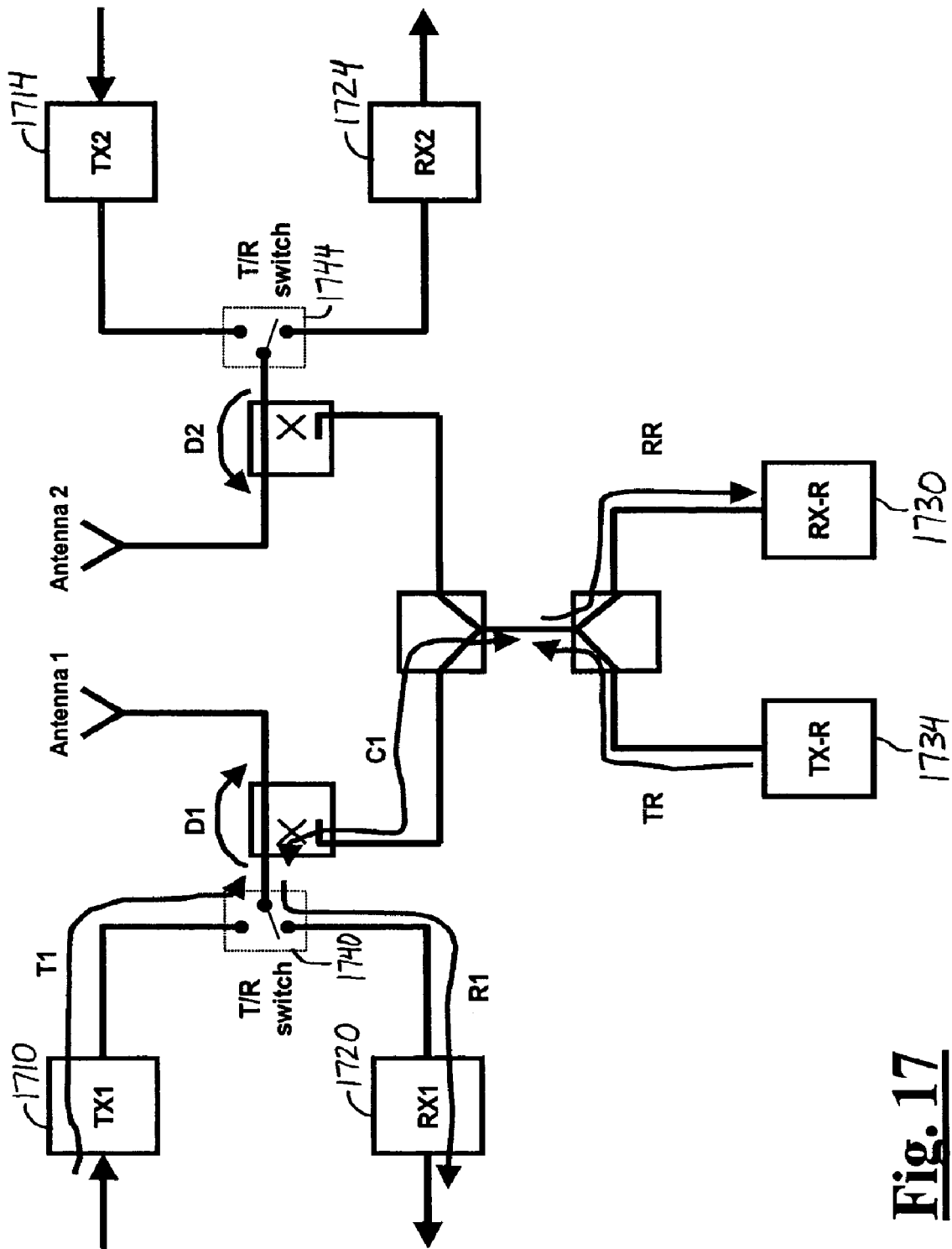
FIG. 17 illustrates a second calibration method.

An alternative way to solve the non-reciprocity problem is illustrated in FIG. 17. The meaning of the references is as follows: T1=complete TX transfer function (TF) until input of directional coupler #1 (DC1); R1=complete RX TF from DC1 input until the end of RX1 (so T/R switch 1740 1744 is included in T1 and R1); D1=TF of DC1 in the direct path; C1=TF from DC1 input, through coupled port until combined port of top splitter/combiner; T2, R2, D2 and C2 are similarly defined; TR=TF of reference TX until combined port of bottom splitter; and RR=TF from combined port of bottom splitter until the end of reference RX.

The unknowns TX1 1710, RX1 1720, TX2 1714, RX2 1724 are to be determined. Measurements are taken from TX1 1710 to RX-R 1730 and from TX2 1714 to RX-R 1730, yielding MT1=T1×C1×RR and MT2=T2×C2×RR. Next, measurements are taken from TX-R 1734 to RX1 1720 and from TX-R 1734 to RX2 1724, yielding MR1=TR×C1×R1 and MR2=TR×C2×R2. In a following step, the ratio of TX over RX measurements is computed for each branch:

$$MT1/MR1 = (T1 \times C1 \times RR)/(TR \times C1 \times R1) = (T1/R1) \times (RR/TR)$$

$$MT2/MR2 = (T2 \times C2 \times RR)/(TR \times C2 \times R2) = (T2/R2) \times (RR/TR)$$

These ratios are the desired measurements (T1/R1) and (T2/R2) with a common multiplicative error (RR/TR), which typically does not affect the reciprocity.

The measurement of the first branch is performed substantially simultaneously to the measurement of the second branch. The LO and sampling clock in the reference TX and RX are locked to the ones in the antenna branches. If needed, to measure the TX1 1710 and TX2 1714, the FDMA scheme with the sub-carriers can be used (e.g., odd sub-carriers from TX1, even sub-carriers from TX2). This approach offers several advantages: nothing needs to be calibrated or matched; compatibility with DBD3 (shared HW in Tx and Rx); can be used for more than 2 branches; no 4-position switch.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of calibrating a transceiver for wireless communication comprising at least one transmitter/receiver pair connected to an antenna branch, such that front-end mismatches in the transmitter/receiver pair can be compensated, the method comprising:

matching outputs of a power splitter between branches of a transceiver, matching directional couplers, and matching transmit/receive/calibration switches between antenna branches of the transceiver;

switching on a calibration connection of the transmit/receive/calibration switch;

in each of the antenna branches generating a known signal and calculating an averaged frequency response of a cascade of a transmitter and the receiver of a transmitter/receiver pair;

connecting the transmit/receive/calibration switch so as to isolate the receiver from both the transmitter and an antenna;

switching on a calibration noise source;

calculating an averaged frequency response of the receiver branches of the transceiver;

determining values to be pre-compensated from the calculated averaged frequency responses of the cascade of the transmitter and the receiver of the transmitter/receiver pair and of the receiver branches of the transceiver; and pre-compensating the transmitter/receiver pair using the inverse of the values.

2. The method of claim 1, wherein the transceiver is a base station transceiver.

3. The method of claim 1, wherein the pre-compensating is performed digitally.

4. The method of claim 1, wherein the process of pre-compensating the transmitter/receiver pair reduces multi-user interference introduced by a front end of the transceiver.

5. The method of claim 1, wherein the transceiver is configured to perform multi-user multiple-input and multi-output wireless transmission.

6. The method of claim 1, wherein the transceiver comprises a base station with multiple antennas.

7. The method of claim 1, wherein the transceiver comprises a spatial-division multiple access base station.

8. The method of claim 1, wherein at least one of the transmitter and the receiver has two or more antennas.

9. The method of claim 1, wherein the process of calculating an averaged frequency response comprises measuring a signal received in the receiver branches substantially simultaneously.

10. A system for calibrating a transceiver for wireless communication comprising at least one transmitter/receiver pair connected to an antenna branch, such that front-end mismatches in the transmitter/receiver pair can be compensated, the system comprising:

a matching module configured to match outputs of a power splitter between branches of a transceiver, to match directional couplers, and to match transmit/receive/calibration switches between antenna branches of the transceiver;

a connection switch module configured to switch on a calibration connection of the transmit/receive/calibration switch;

an antenna branch calculation module configured to, in each of the antenna branches, generate a known signal and to calculate an averaged frequency response of a cascade of a transmitter and the receiver of a transmitter/receiver pair;

a connection module configured to connect the transmit/receive/calibration switch so as to isolate the receiver from both the transmitter and an antenna;

a noise source switch module configured to switch on a calibration noise source;

a receiver branch calculation module configured to calculate an averaged frequency response of the receiver branches of the transceiver;

a determination module configured to determine values to be pre-compensated from the calculated averaged frequency responses of the cascade of the transmitter and the receiver of the transmitter/receiver pair and of the receiver branches of the transceiver; and a pre-compensation module configured to pre-compensate the transmitter/receiver pair using the inverse of the values.

11. The system of claim 10, wherein the transceiver is a base station transceiver.

12. The system of claim 10, wherein the pre-compensation module is configured to perform pre-compensating digitally.

13. The system of claim 10, wherein the pre-compensation module is configured to reduce multi-user interference introduced by a front end of the transceiver.

14. The system of claim 10, wherein the transceiver is configured to perform multi-user multiple-input and multi-output wireless transmission.

15. The system of claim 10, wherein the transceiver comprises a base station with multiple antennas.

16. The system of claim 10, wherein the transceiver comprises a spatial-division multiple access base station.

17. The system of claim 10, wherein at least one of the transmitter and the receiver has two or more antennas.

18. The system of claim 10, wherein the receiver branch calculation module is configured to measure a signal received in the receiver branches substantially simultaneously.

19. A system for calibrating a transceiver for wireless communication comprising at least one transmitter/receiver pair connected to an antenna branch, such that front-end mismatches in the transmitter/receiver pair can be compensated, the system comprising:

means for matching outputs of a power splitter between branches of a transceiver, matching directional couplers, and matching transmit/receive/calibration switches between antenna branches of the transceiver;

means for switching on a calibration connection of the transmit/receive/calibration switch;

means for, in each of the antenna branches, generating a known signal and calculating an averaged frequency response of a cascade of a transmitter and the receiver of a transmitter/receiver pair;

means for connecting the transmit/receive/calibration switch so as to isolate the receiver from both the transmitter and an antenna;

means for switching on a calibration noise source;

means for calculating an averaged frequency response of the receiver branches of the transceiver;

means for determining values to be pre-compensated from the calculated averaged frequency responses of the cascade of the transmitter and the receiver of the transmitter/receiver pair and of the receiver branches of the transceiver; and means for pre-compensating the transmitter/receiver pair using the inverse of the values.

20. The system of claim 19, wherein the pre-compensating means performs pre-compensating digitally.

* * * * *